(12) United States Patent
Biasutto et al.

(10) Patent No.: US 12,162,705 B2
(45) Date of Patent: Dec. 10, 2024

(54) POWER AND CONTROL SYSTEM FOR A LOADING DOCK ASSEMBLY

(71) Applicant: Blue Giant Equipment Corporation, Mississauga (CA)

(72) Inventors: Gerard Biasutto, Mississauga (CA); Trevor Scheffel, Mississauga (CA); Inderpreet Singh, Mississauga (CA)

(73) Assignee: Blue Giant Equipment Corporation, Mississauga (CA)

( * ) Notice: Subject to any disclaimer, the term of this patent is extended or adjusted under 35 U.S.C. 154(b) by 253 days.

(21) Appl. No.: 17/702,228

(22) Filed: Mar. 23, 2022

(65) Prior Publication Data

US 2022/0306409 A1   Sep. 29, 2022

Related U.S. Application Data

(60) Provisional application No. 63/165,438, filed on Mar. 24, 2021.

(51) Int. Cl.

| | |
|---|---|
| *B65G 69/00* | (2006.01) |
| *B65G 69/28* | (2006.01) |
| *G08C 19/00* | (2006.01) |
| *H04B 3/54* | (2006.01) |
| *G07C 9/10* | (2020.01) |

(52) U.S. Cl.
CPC ....... *B65G 69/003* (2013.01); *B65G 69/2882* (2013.01); *G08C 19/00* (2013.01); *H04B 3/54* (2013.01); *B65G 2203/0283* (2013.01); *B65G 2203/042* (2013.01); *B65G 2203/047* (2013.01); *G07C 9/10* (2020.01)

(58) Field of Classification Search
CPC . G08C 19/00; H04B 3/54; G07C 9/10; B65G 69/003; B65G 69/2882; B65G 2203/0283; B65G 2203/042; B65G 2203/047; B65G 2207/40
See application file for complete search history.

(56) References Cited

U.S. PATENT DOCUMENTS

| | | |
|---|---|---|
| 5,047,748 A | 9/1991 | Trickle |
| 5,168,267 A | 12/1992 | Trickle |
| 5,831,540 A | 11/1998 | Sullivan et al. |

(Continued)

FOREIGN PATENT DOCUMENTS

WO   2019173811   9/2019

*Primary Examiner* — Brian Wilson
(74) *Attorney, Agent, or Firm* — Price Heneveld LLP

(57) ABSTRACT

A dock apparatus includes a plurality of loading dock components. An identification system is coupled with the plurality of loading dock components. A control panel is in signal communication with the plurality of loading dock components via the identification system. The identification system automatically cooperates with the control panel to define an operating sequence of the plurality of loading dock components. A power module is in signal communication with the control panel and an installed component of the plurality of loading dock components. The control panel provides instructions to the power module according to the operating sequence and the power module delivers a predetermined electrical current to the installed components of the plurality of loading dock components in a sequential pattern defined by the operating sequence.

20 Claims, 16 Drawing Sheets

(56) References Cited

U.S. PATENT DOCUMENTS

| | | | |
|---|---|---|---|
| 6,781,516 B2 | 8/2004 | Reynard et al. | |
| 6,975,226 B2 | 12/2005 | Reynard et al. | |
| 9,728,020 B2* | 8/2017 | Freese | G07C 9/00817 |
| 10,113,352 B2 | 10/2018 | McNeill et al. | |
| 10,676,295 B1 | 6/2020 | Manone et al. | |
| 2004/0223275 A1* | 11/2004 | Yanagida | H02J 13/00036 |
| | | | 361/62 |
| 2006/0244571 A1* | 11/2006 | Yaney | H04B 3/56 |
| | | | 333/24 R |
| 2019/0144218 A1* | 5/2019 | Hoofard | B65G 69/005 |
| | | | 52/173.2 |

* cited by examiner

POWER AND CONTROL SYSTEM FOR A LOADING DOCK ASSEMBLY

CROSS-REFERENCE TO RELATED APPLICATION

This application claims priority to and the benefit under 35 U.S.C. § 119(e) of U.S. Provisional Patent Application No. 63/165,438, filed on Mar. 24, 2021, entitled POWER AND CONTROL SYSTEM FOR A LOADING DOCK ASSEMBLY, the entire disclosure of which is hereby incorporated herein by reference.

FIELD OF THE INVENTION

The present invention generally relates to loading dock assemblies for distribution facilities and for the loading and unloading of products and other cargo.

BACKGROUND OF THE INVENTION

Within distribution facilities and commercial establishments, loading docks are used for the loading and unloading of products and other cargo. Various operating systems are used within these loading dock assemblies. These control mechanisms are typically focused on the safety of the people within and around the loading dock as well as the driver and other personnel within the distribution facility. To further this purpose, loading dock assemblies are typically operated according to specific procedures and protocols to enhance these safety measures.

SUMMARY OF THE INVENTION

According to a first aspect of the present disclosure, a dock apparatus includes a plurality of loading dock components. An identification system is coupled with the plurality of loading dock components. A control panel is in signal communication with the plurality of loading dock components via the identification system. The identification system automatically cooperates with the control panel to define an operating sequence of the plurality of loading dock components. A power module is in signal communication with the control panel and an installed component of the plurality of loading dock components. The control panel provides instructions to the power module according to the operating sequence and the power module delivers a predetermined electrical current to the installed components of the plurality of loading dock components in a sequential pattern defined by the operating sequence.

According to a second aspect of the present disclosure, a method for activating a loading dock station includes installing a plurality of loading dock components on a loading dock. The plurality of loading dock components are attached to a control panel. An identity of the plurality of loading dock components is validated using dedicated identification modules of each installed component of the plurality of loading dock components to define validated components. An operating sequence is produced, wherein the control panel automatically generates the operating sequence based upon the validated components. The control panel is attached to a power module. The power module is attached to the plurality of loading dock components. The plurality of loading dock components is activated according to the operating sequence. The control panel directs the power module to deliver a predetermined sequence of electrical current to the plurality of loading dock components.

According to a third aspect of the present disclosure, a dock apparatus includes a plurality of loading dock components. A plurality of identification modules are attached to each component of the plurality of loading dock components. A control panel is in signal communication with the plurality of loading dock components via the plurality of identification modules. The plurality of identification modules automatically cooperates with the control panel to generate an operating sequence of the plurality of loading dock components. A power module is in signal communication with the control panel, and an installed component of the plurality of loading dock components. The control panel provides instructions to the power module according to the operating sequence and the power module delivers a predetermined electrical current to the installed components of the plurality of loading dock components in a sequential pattern defined by the operating sequence. The control panel includes a master sequence that includes a potential set of loading dock components. The operating sequence is generated by comparing the plurality of loading dock components with the potential set of loading dock components. The master sequence is modified to include activations that correspond to the installed components of the plurality of loading dock components.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
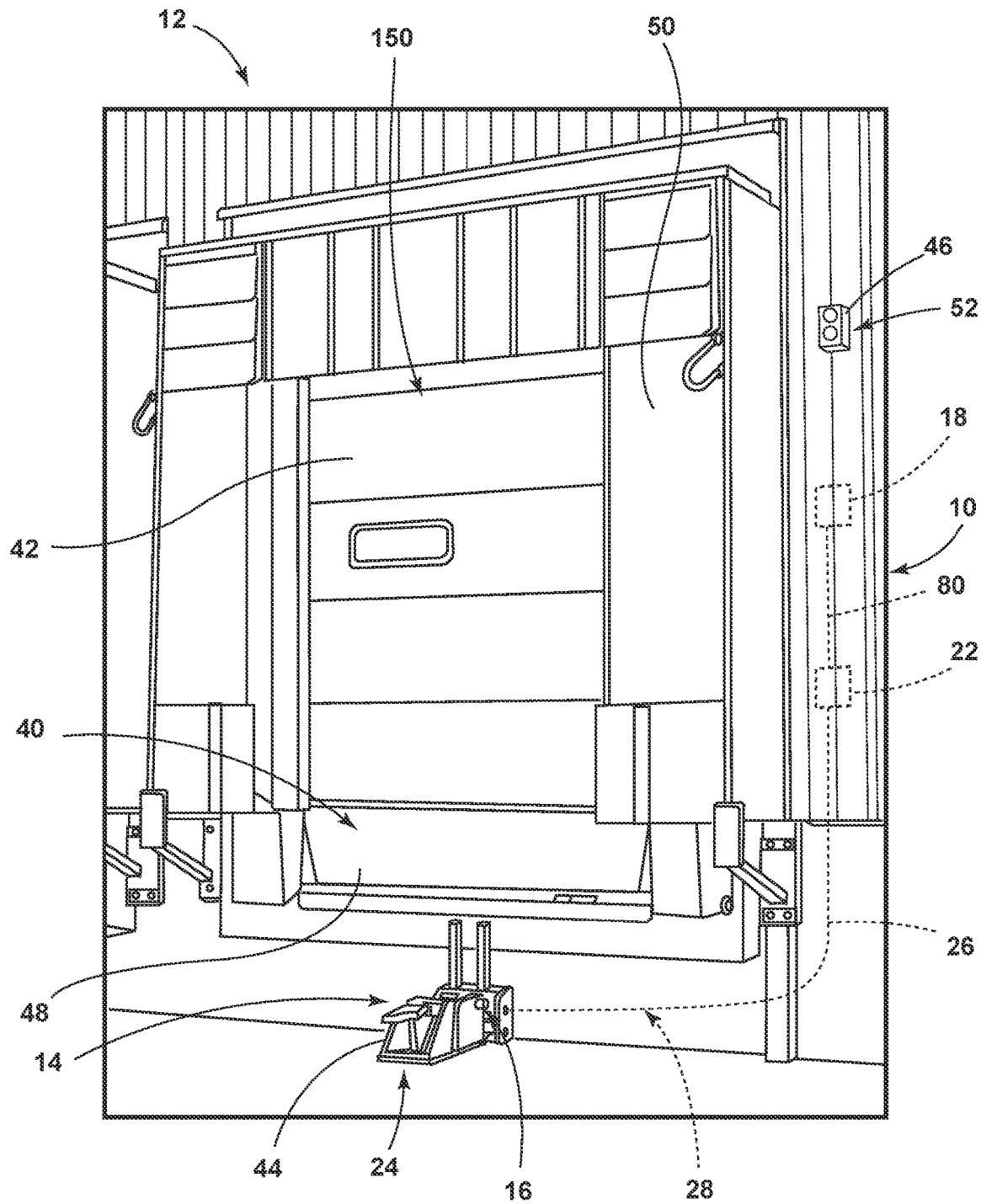
FIG. 1 is a top perspective view of a loading dock assembly within a facility.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As exemplified in FIGS. 1-5, reference numeral 10 generally refers to a loading dock assembly that is incorporated within a facility 12 for loading and unloading various products and other cargo relative to a vehicle 34. The facility 12 utilizing the loading dock assembly 10 is typically in the form of a distribution facility, commercial facility, industrial facility or other similar structure. According to the various aspects of the device, a loading dock assembly 10, or dock apparatus, includes a plurality of loading dock components 14 that make up the loading dock assembly 10. An identification system 16 is coupled with each dock component 14 of the plurality of loading dock components 14. A control panel 18 is placed in signal communication with the plurality of loading dock components 14 via the identification system 16. The identification system 16 automatically cooperates with the control panel 18 to define an operating sequence 20 of the plurality of loading dock components 14 for the loading dock assembly 10. A power module 22 is in signal communication with the control panel 18 and the various installed components 24 of the plurality of loading dock components 14. The control panel 18 provides instructions to the power module 22 according to the operating sequence 20. The power module 22 delivers a predetermined electrical current 26 to the installed components 24 of the plurality of loading dock components 14 in a sequential pattern 28 that is defined by the operating sequence 20. In this manner, the operating sequence 20 of the loading dock assembly 10 is determined by the identification system 16 and the specific installed components 24 that are incorporated in the particular loading dock assembly 10. Stated another way, only those steps of the operating sequence 20 that are able to be performed by the installed components 24 are incorporated within the defined operating sequence 20, as determined between the control panel 18 and the identification system 16. As will be described more fully below, uninstalled components or components that are not part of the particular loading dock assembly 10 are not provided for in the operating sequence 20.

Referring again to FIGS. 1-5, the control panel 18 typically includes or can be in communication with a user interface 160. This user interface 160 can be used by personnel working in the facility 12 to activate the various steps in the operating sequence 20. It is contemplated that the control panel 18 will not typically be able to perform the operating sequence 20 automatically. Rather, the personnel will utilize the user interface 160 to activate at least a portion of the steps of the operating sequence 20 to ensure that the conditions within and around the loading dock assembly 10 are appropriate for proceeding with performing subsequent steps in the operating sequence 20. Accordingly, the control panel 18 can be used for formulating the operating sequence 20 and the user interface 160 is used for initiating and deploying the steps of the operating sequence 20.

According to the various aspects of the device, the various loading dock components 14 can include, but are not limited to, a dock leveler 40, a dock door 42, a vehicle restraint 44, a lighting system 46, a dock lip 48, an inflatable shelter 50, various signaling components 52, and other aspects of the loading dock assembly 10 that are generally known to those of skill in the art of loading dock facilities.

Referring again to FIGS. 1-5, the identification system 16 includes a plurality of identification modules 60 that are attached to each installed component 24 of the plurality of loading dock components 14, respectively. The plurality of identification modules 60 communicate with the control panel 18 to automatically generate the operating sequence 20, as well as the sequential pattern 28 that the power module 22 delivers the predetermined electrical current 26 to the various installed components 24 of the loading dock assembly 10.

During installation of the various loading dock components 14 of the loading dock assembly 10, each individual dock component 14 is coupled with the control panel 18. The identification module 60 for each installed component 24 communicates with the control panel 18 so that each installed component 24 can be identified by the control panel 18. This communication between the identification module 60 and the control panel 18 informs the control panel 18 about which components are installed or are being installed and generates an inventory of the installed components 24 of the loading dock assembly 10. When the dock components 14 of the loading dock assembly 10 are installed, the control panel 18 typically utilizes various predetermined rules and safety protocols for determining the sequence of steps that are to be performed during operation of the loading dock assembly 10. Through these steps, the control panel 18 generates the operating sequence 20 based upon the installed components 24 of the loading dock assembly 10. The installation of the dock components 14 of the loading dock assembly 10, as well as the identification system 16, is accomplished through a plug interface 70 within the control panel 18. The control panel 18 includes multiple module connections 72 that allow for direct connection of each dock component 14 of the loading dock assembly 10.

In conventional loading dock assemblies, the components are typically installed via a "fly wire" system where each phase of the electrical wire and the ground wire are separately installed with a control panel. The use of the "fly wire" system is prone to faulty connections, mis-wiring, and other defects during installation and operation of conventional loading dock assemblies.

Using the direct plug interface 70 between the installed components 24 of the loading dock assembly 10 and the module connections 72 of the control panel 18, installation of the various dock components 14, from a control aspect, is simplified. In addition, through this plug interface 70, the individual identification modules 60 of the identification system 16 communicate with the control panel 18 to provide an inventory of installed components 24 that will make up the operating sequence 20 for the loading dock assembly 10. While the connection between the control panel 18 and the individual installed components 24 is simplified, the connection between the power module 22 and the individual installed components 24 may require more significant wiring needs to account for the higher levels of electrical current 26 that are delivered to the installed components 24 of the loading dock assembly 10 during the performance of the sequential pattern 28 of predetermined electrical current 26.

During operation of the loading dock assembly 10, the control panel 18 generates an operating cycle for the loading dock assembly 10. A data connection 80 between the control panel 18 and the power module 22 is provided through a low voltage wire. Data communications through this low voltage wire between the control panel 18 and the power module 22 provides instructions to the power module 22 for delivering the predetermined electrical current 26 in the sequential pattern 28 that is defined by the operating sequence 20. Through this data connection 80, the interface between the individual installed components 24 and the control panel 18 and between the control panel 18 and the power module 22 are all low-voltage connections, or, in certain instances, communication via wireless network. Typically, the only high-voltage connection within the loading dock assembly 10 is between the power module 22 and the installed components 24. By limiting the high-voltage connections in this way, additional safety protocols are included within the loading dock assembly 10, as described herein. Also, as discussed herein, the activation of steps within the operating sequence 20 is typically initiated by personnel of the facility 12 using the user interface 160.

Referring again to FIGS. 2-4, within the power module 22, a main AC supply 90 is provided to the power module 22. Within the power module 22, where necessary, at least one electrical transformer 92, and typically a plurality of electrical transformers 92, are included for transforming the power to a DC voltage 94, or to a lower voltage current that is consistent with the power needs of each of the installed components 24 of the loading dock assembly 10. Accordingly, the configuration of the power module 22 can depend upon the installed components 24 within the loading dock assembly 10, as well as the voltage needs of those installed components 24. Because the power module 22 may include multiple electrical transformers 92, the power module 22 can include multiple power outlets 96 for the delivery of at least two distinct and predetermined electrical current or currents 26 to the installed components 24 of the loading dock assembly 10. To deliver one or more electrical currents 26, the power module 22 can include one or a plurality of power delivery switches. These power delivery switches can be activated and deactivated according to the operating sequence 20 and the sequential pattern 28 for providing the electrical current 26 to the installed components 24. The various schematics provided in FIGS. 1-12 are exemplary in nature. Changes to the voltages, electrical currents 26, configurations and layouts of the loading dock assemblies 10 in contemplated.

The various communications and delivery of electrical power can be provided via a Communications and Power Bus (CPB). Portions and implementations of the CPB can extend between the control panel 18 and the power module 22, as well as between the power module 22 and the dock components 14 and the related aspects of the identification system 16. The CPB can include any one of various bus configurations. These configurations can include, but are not limited to a bi-directional Serial Network Protocol, a Local Interconnect Network (LIN) and other similar networks.

Referring again to FIG. 4, during the life of the loading dock assembly 10 or during installation of the loading dock assembly 10, individual dock components 14 may be added to the loading dock assembly 10. When these dock components 14 are added, the addition of an added component 110 of the plurality of loading dock components 14 defines a redefined operating sequence 112. In this manner, the added component 110 includes a new identification module 114 of the identification system 16. The identification system 16 having the new identification module 114 automatically communicates with the control panel 18 to produce the redefined operating sequence 112 that corresponds to a redefined sequential pattern 116 of electrical current 26 that is delivered by the power module 22 to the plurality of loading dock components 14. When the added component 110 is coupled with the control panel 18, the added component 110 is attached to one of the module connections 72 of the control panel 18. Through this connection, the new identification module 114 communicates with the control panel 18 and modifies the operating sequence 20 to add the specific steps required by the added component 110 to accomplish the various safety protocols that are typically hard-wired or downloaded into the control panel 18. This redefined operating sequence 112 may result in the addition of steps for operating the loading dock assembly 10. The addition of the added component 110 may also result in a reordering or shuffling of the various steps for operating the loading dock assembly 10. The changes in the redefined operating sequence 112 depend upon which dock component 14 is being added and the safety protocols that relate to that added component 110.

Figure 2:
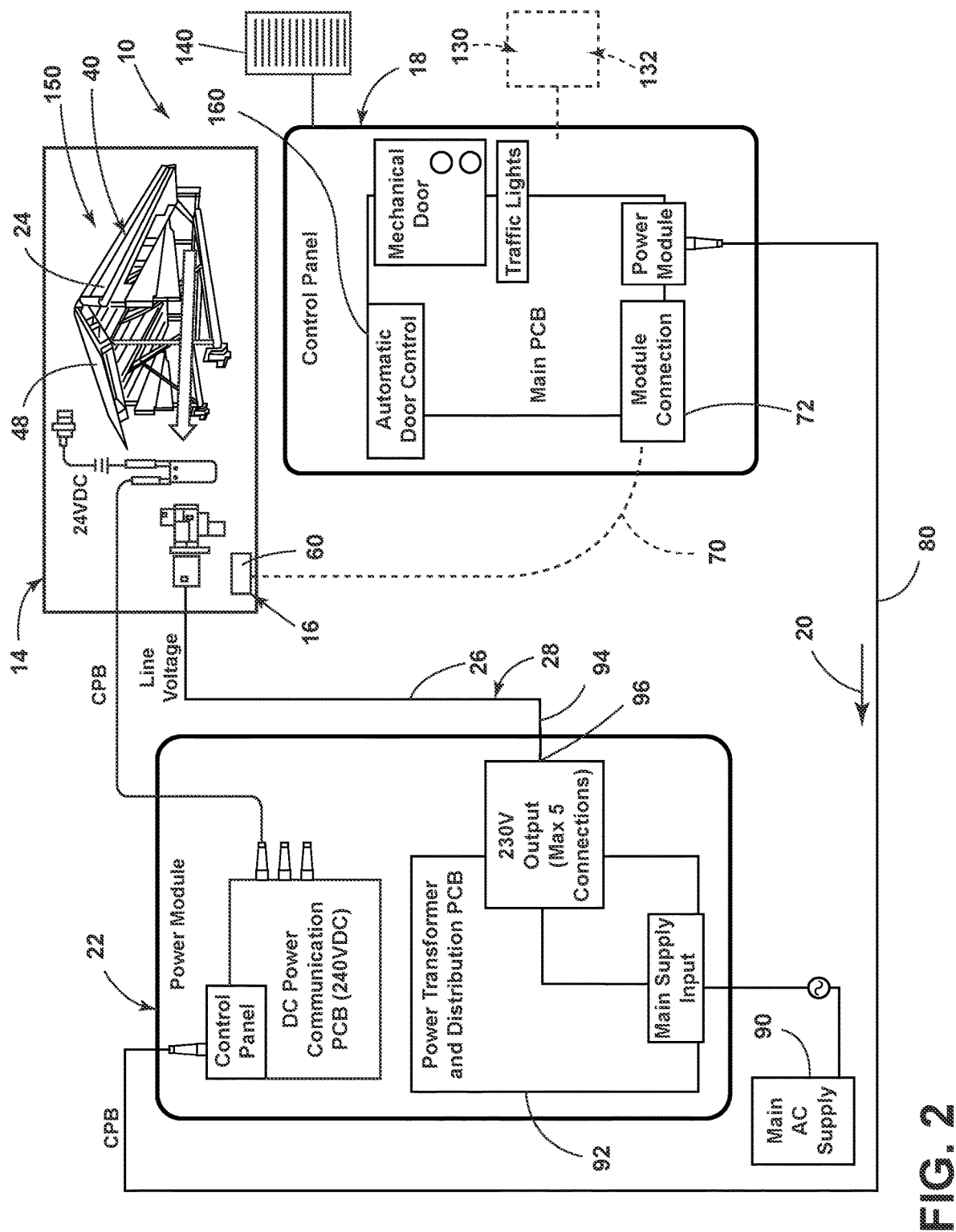
FIG. 2 is a schematic diagram illustrating an aspect of the control panel and power module that operate in conjunction to perform the various protocols of a loading dock assembly.
Figure 3:
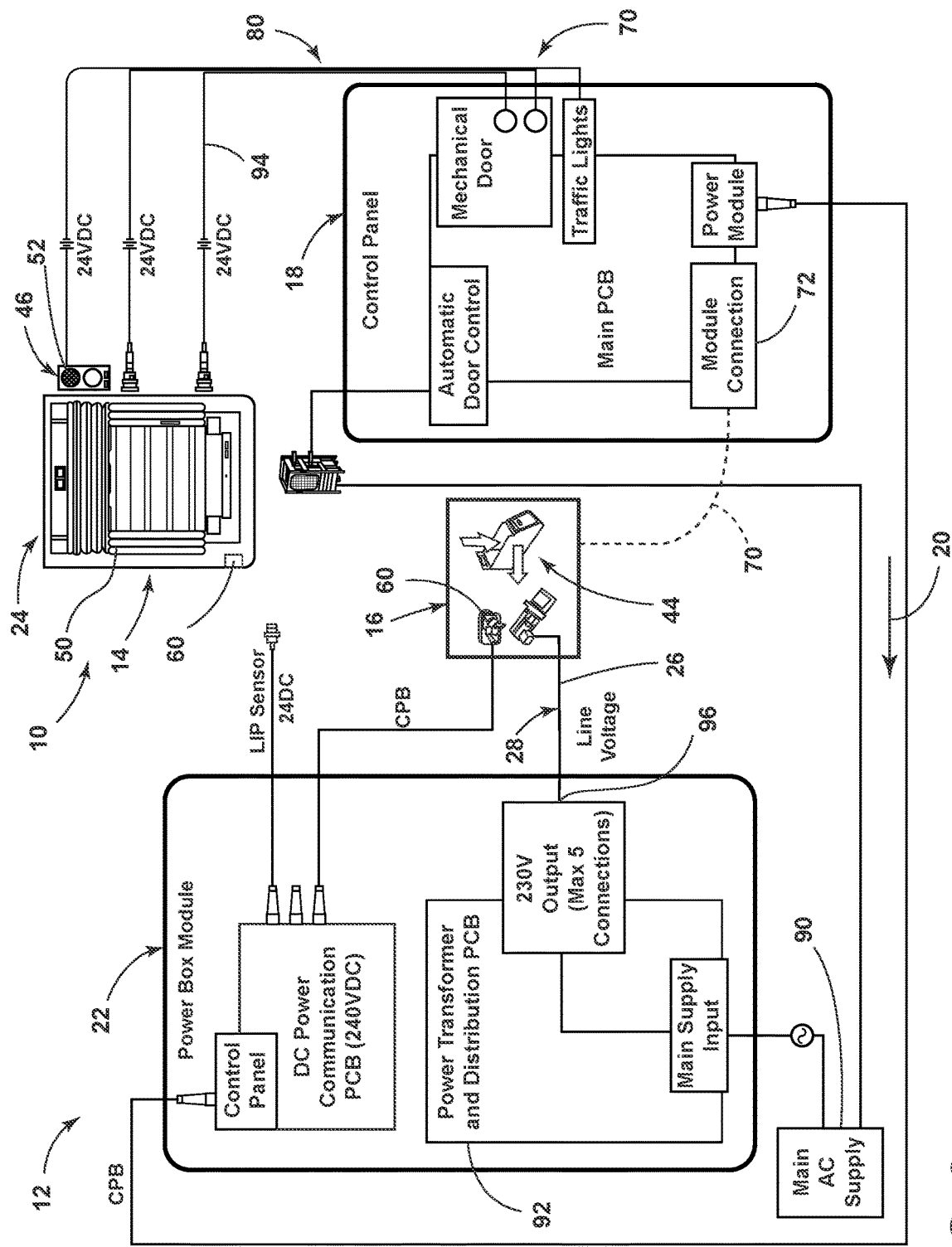
FIG. 3 is a schematic diagram illustrating an aspect of the control panel and power module that operate in conjunction to perform the various protocols of a loading dock assembly.
Figure 4:
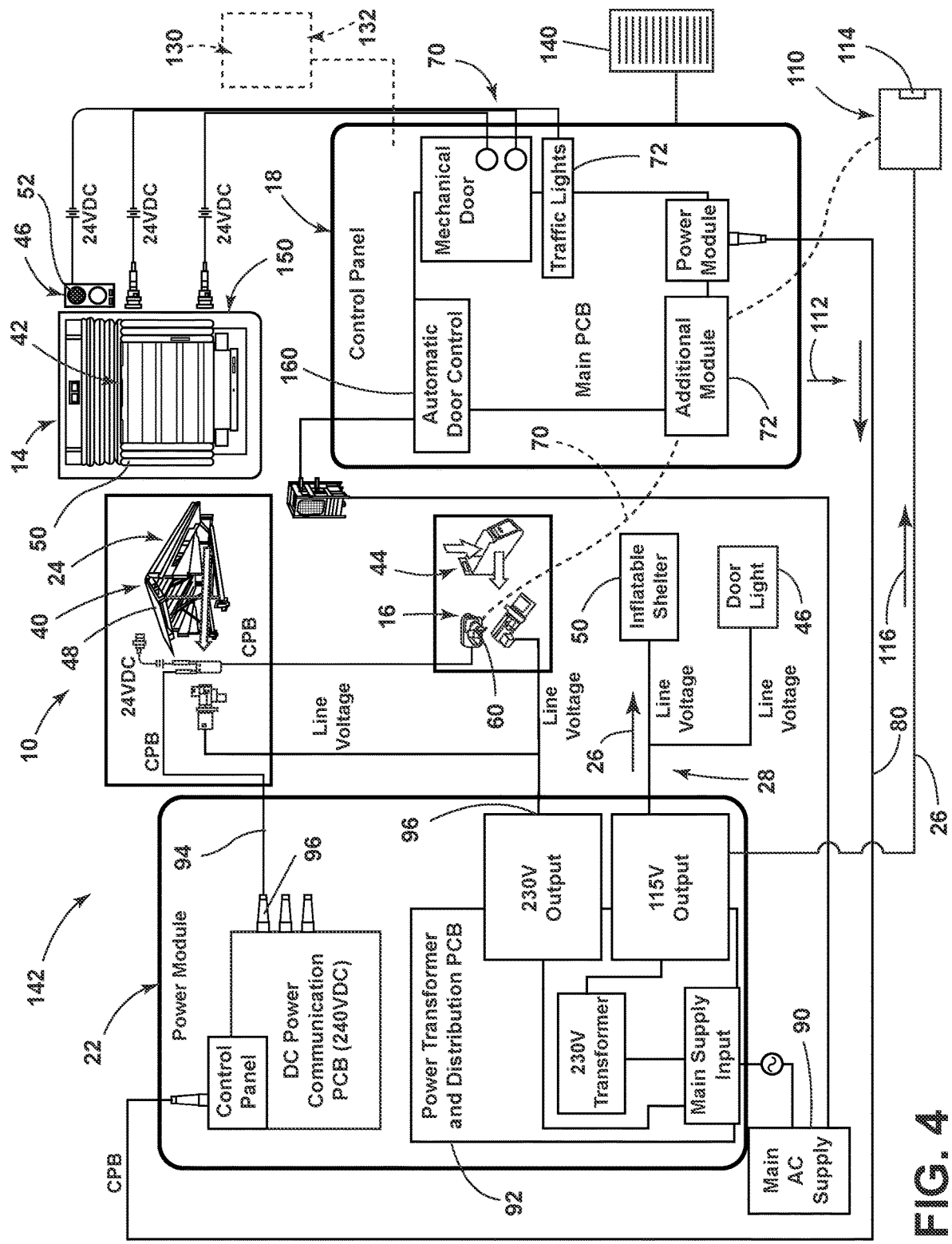
FIG. 4 is a schematic diagram illustrating an aspect of the control panel and power module that operate in conjunction to perform the various protocols of a loading dock assembly.
Figure 5:
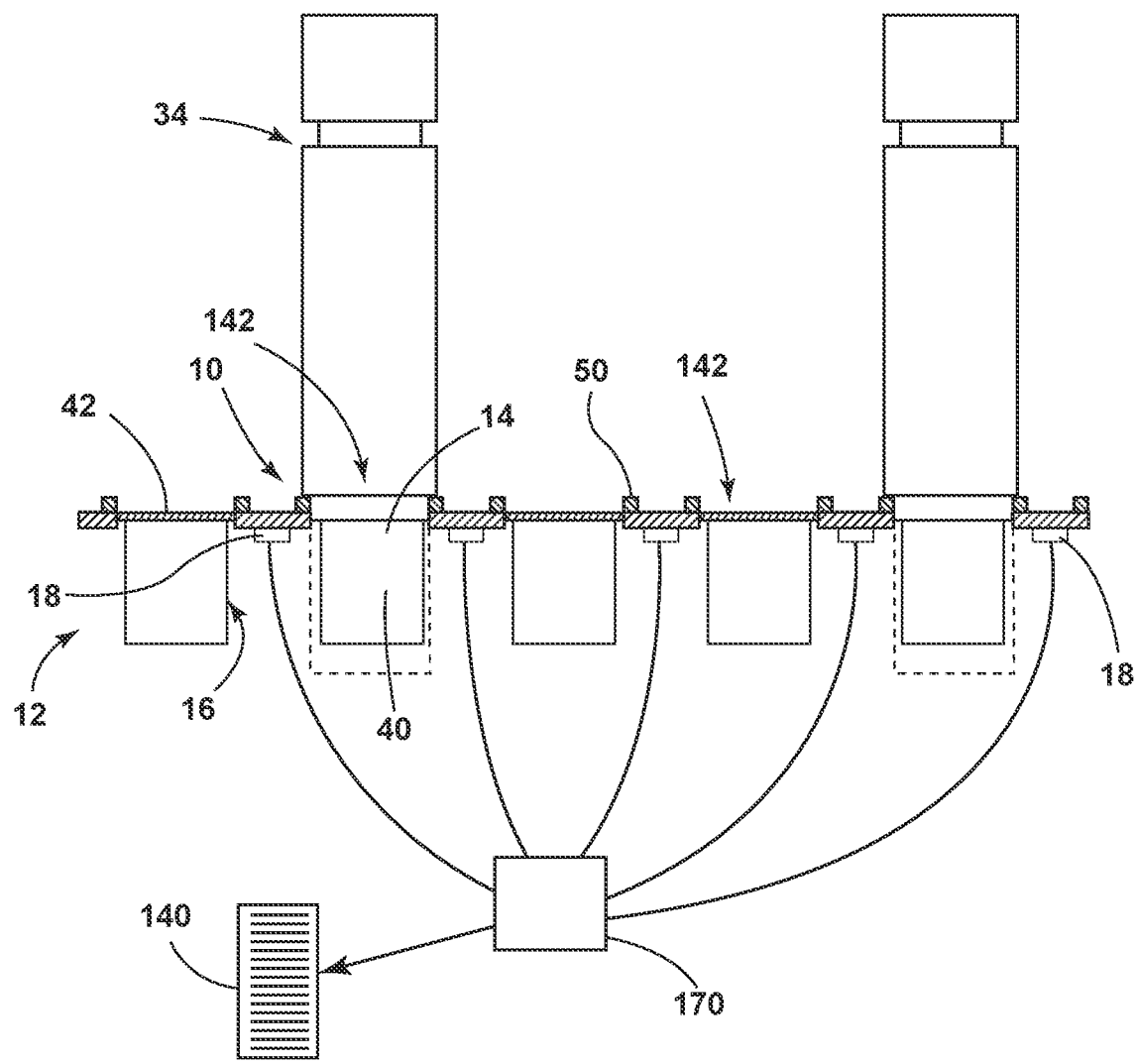
FIG. 5 is a schematic diagram of a facility incorporating multiple loading dock stations that are connected to a controller.
Figure 6:
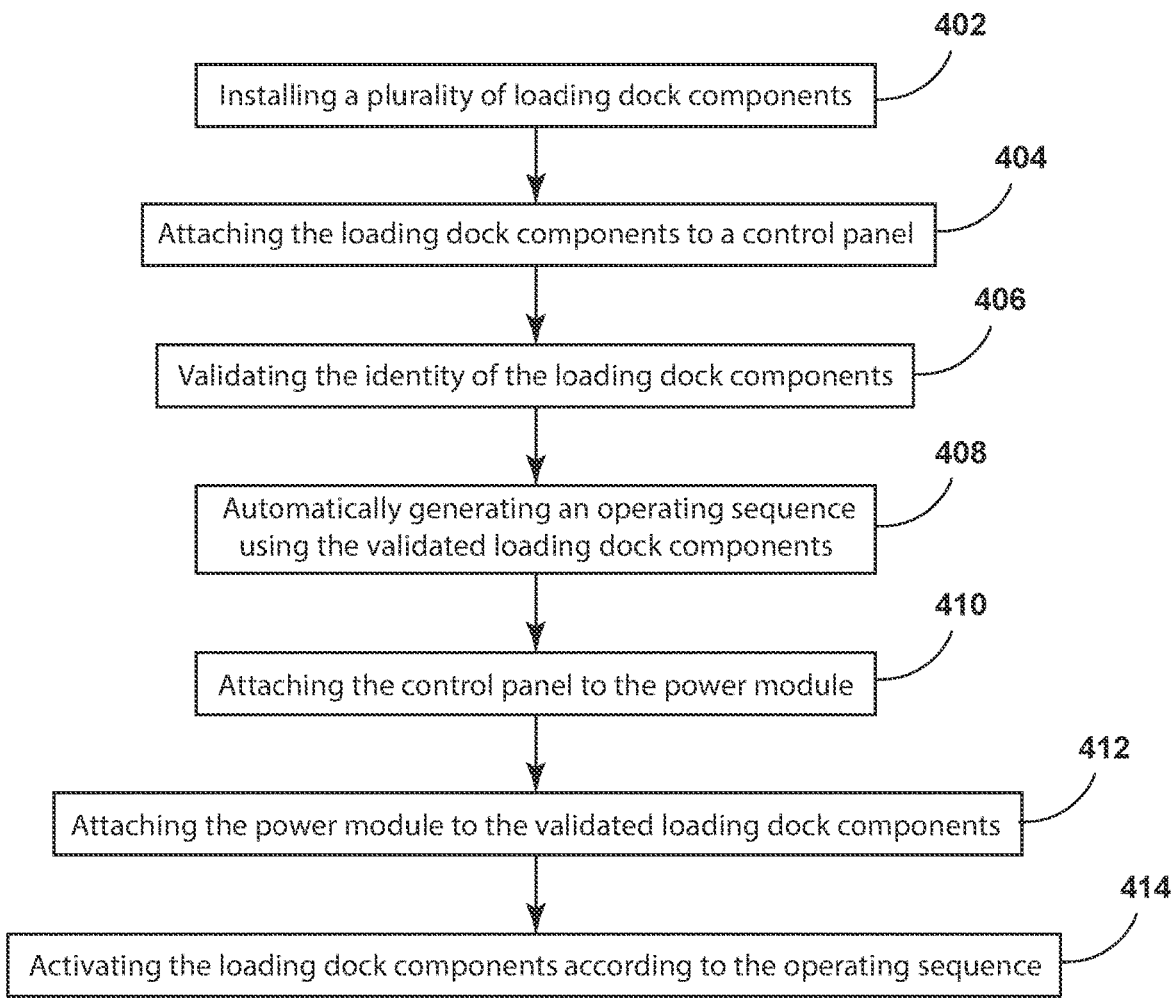
FIG. 6 is a schematic linear flow diagram illustrating a method for activating a loading dock station within a loading dock facility.
Figure 7:
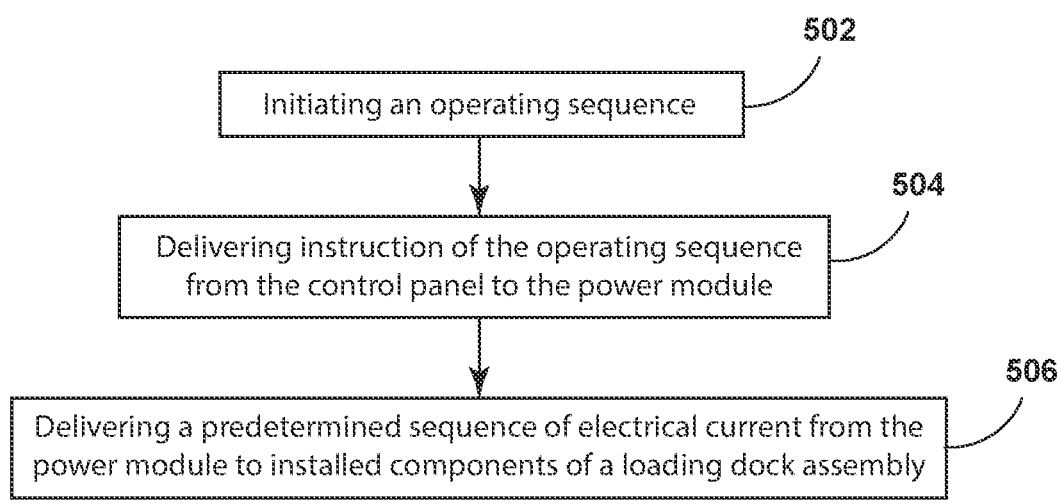
FIG. 7 is a schematic linear flow diagram illustrating a method for operating various components of the loading dock assembly utilizing a control panel, power module and identification module.
Figure 8:
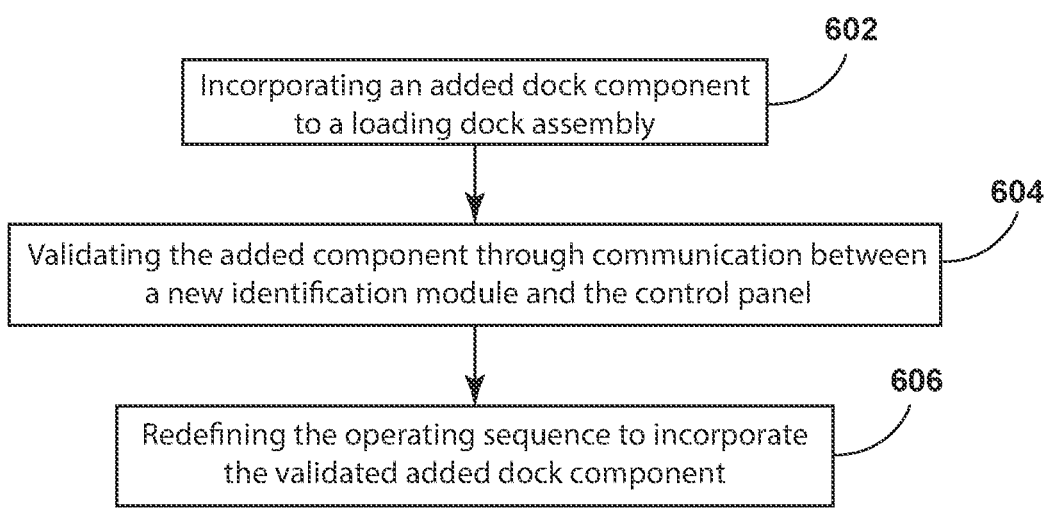
FIG. 8 is a schematic linear flow diagram illustrating a method for installing a loading dock assembly utilizing an identification system coupled with each of the components of the loading dock assembly.

As exemplified in FIGS. 2-4, within the control panel 18, a master sequence 130 may be included, where this master sequence 130 is derived from a potential set 132 of loading dock components 14. This potential set 132 of loading dock components 14 may include a comprehensive inventory of all of the dock components 14 that may be added to that loading dock assembly 10. This may be based upon different packages, trims, features, and other options that may be purchased for installation of the loading dock assembly 10. During installation of the various dock components 14 with the control panel 18, the operating sequence 20 is generated by comparing the installed components 24 with the potential set 132 of loading dock components 14 from the master sequence 130. This master sequence 130 is then modified to include activations and steps that correspond to the installed components 24 of the plurality of loading dock components 14. Additional activations or steps from the master sequence 130 that do not correspond to an installed component 24 of the loading dock assembly 10 can be deactivated or suppressed for generation and performance of the operating sequence 20 of the loading dock assembly 10.

As discussed above, installation of added components 110 to the loading dock assembly 10 may result in a redefinition, as well as reordering, of various steps from the master sequence 130 saved within the control panel 18. Accordingly, only those activations that are relevant to the installed components 24 are included, and those activations that are not relevant to the installed components 24 can be excluded from the operating sequence 20. These excluded activations are those that do not correspond to any of the installed components 24 of the plurality of loading dock components 14 for the loading dock assembly 10.

According to various aspects of the device, it is also contemplated that the control panel 18 can be fitted with certain rules or safety protocols that must be adhered to. During installation of the various dock components 14 of the loading dock assembly 10, the identification system 16 operates with these rules and protocols to derive or generate the operating sequence 20 for the loading dock assembly 10. By way of example, and not limitation, such a protocol can be a rule that prevents the dock door 42 from opening until such time as the vehicle restraint 44 is activated and the vehicle 34 is restrained relative to the facility 12. Other such protocols may be included for generating the operating sequence 20 of the loading dock assembly 10. Typically, the rules and safety protocols that help to govern operation of the loading dock assembly 10 are incorporated into the user interface 160. Various prompts 212 and queries can be provided to the personnel interacting with the user interface 160 to check and verify that certain requirements and conditions relating to the rules and safety protocols are met before the next step in the operating sequence 20 can be activated. By way of example and not limitation, certain steps in the operating sequence 20 may require communication between personnel inside the facility 12 and a driver or personnel outside the facility 12. When the dock door 42 is closed, the user interface 160 and components of the loading dock facility 12 can be utilized for providing the verification and communication between drivers and personnel at the loading dock assembly 10 of the facility 12 who may not be able to see one another.

Figure 9:
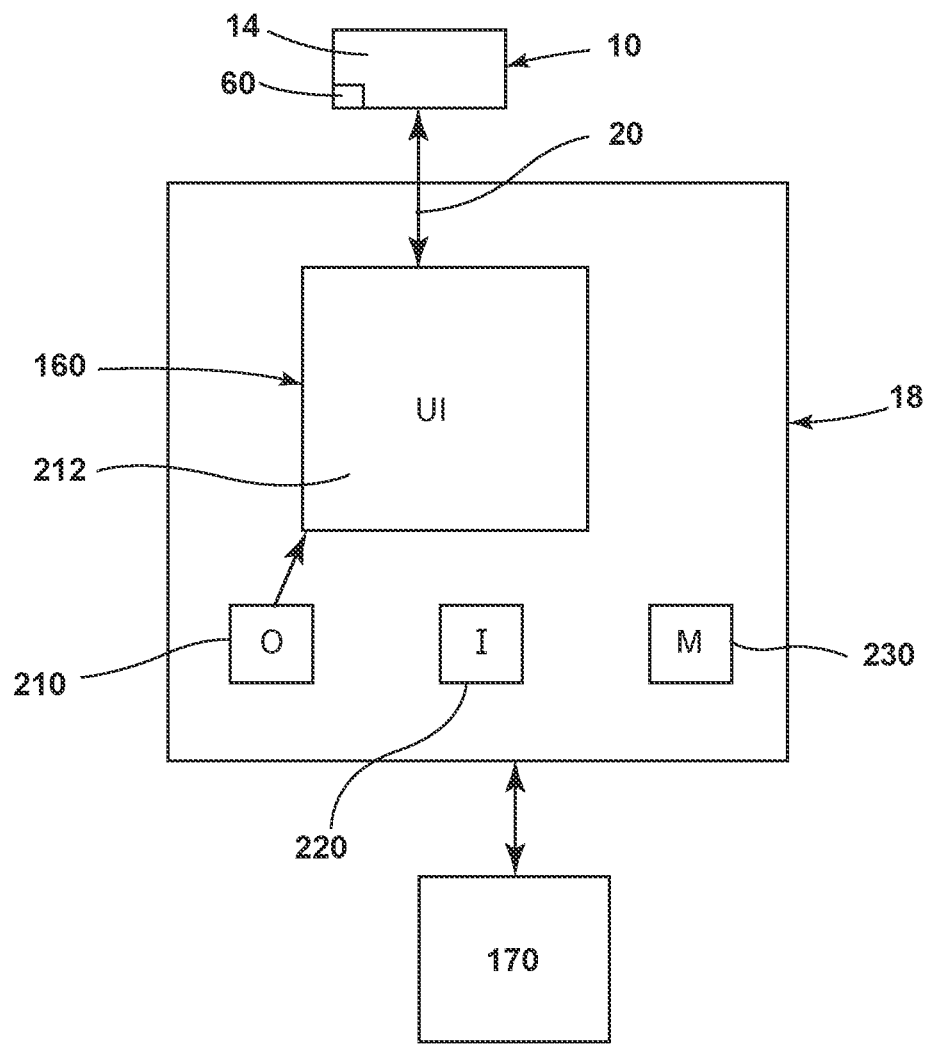
FIG. 9 is a schematic diagram of an aspect of the control panel and user interface in an operator interface configuration.
Figure 10:
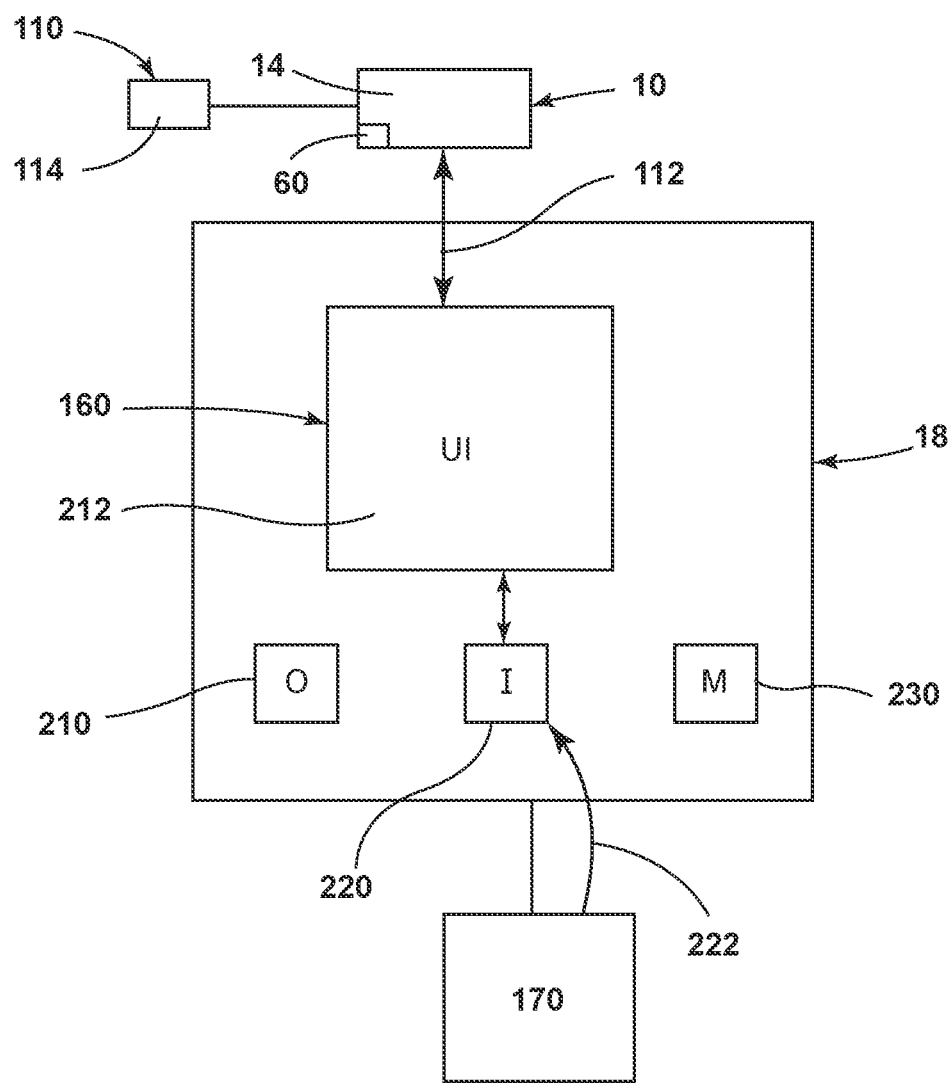
FIG. 10 is a schematic diagram of an aspect of the control panel and user interface in an installer interface configuration.
Figure 11:
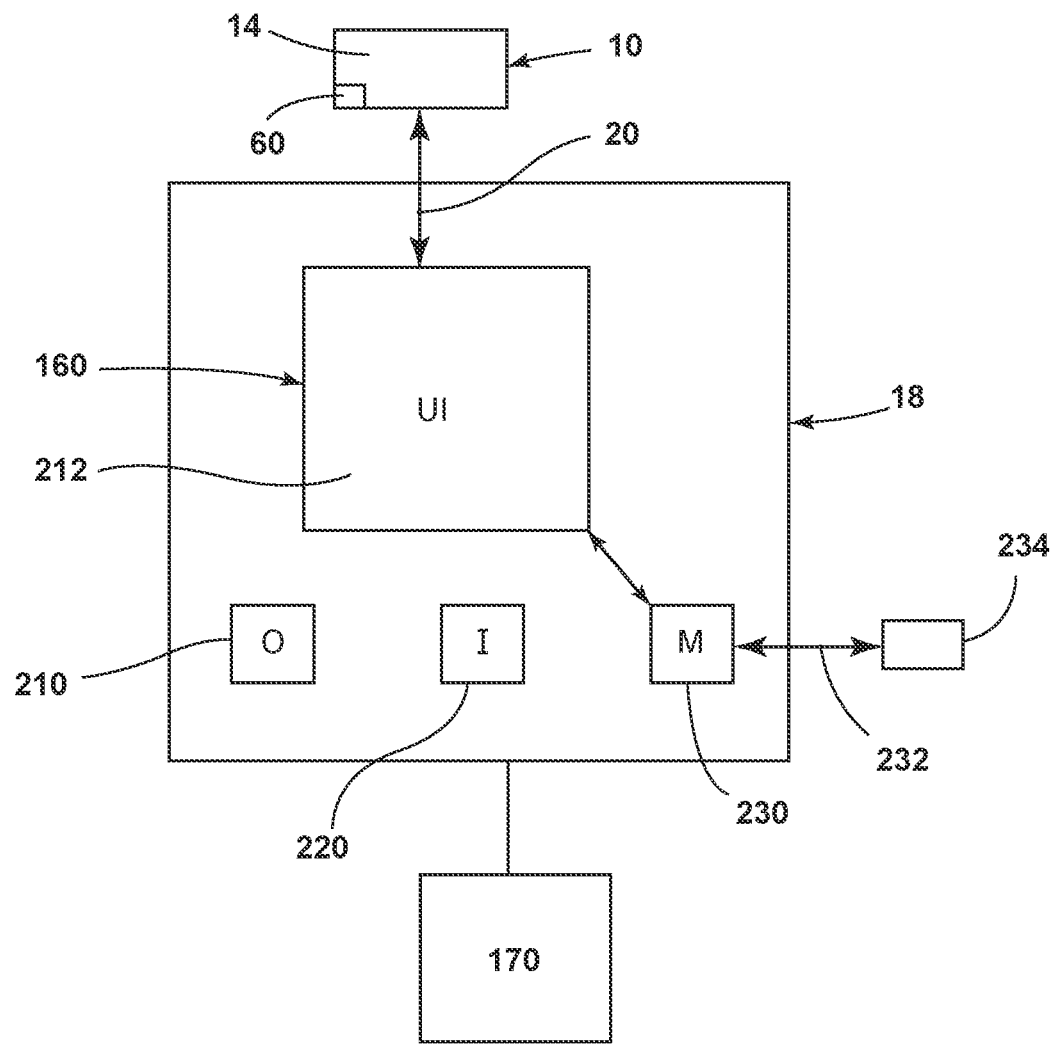
FIG. 11 is a schematic diagram of an aspect of the control panel and user interface in a maintenance interface configuration.
Figure 12:
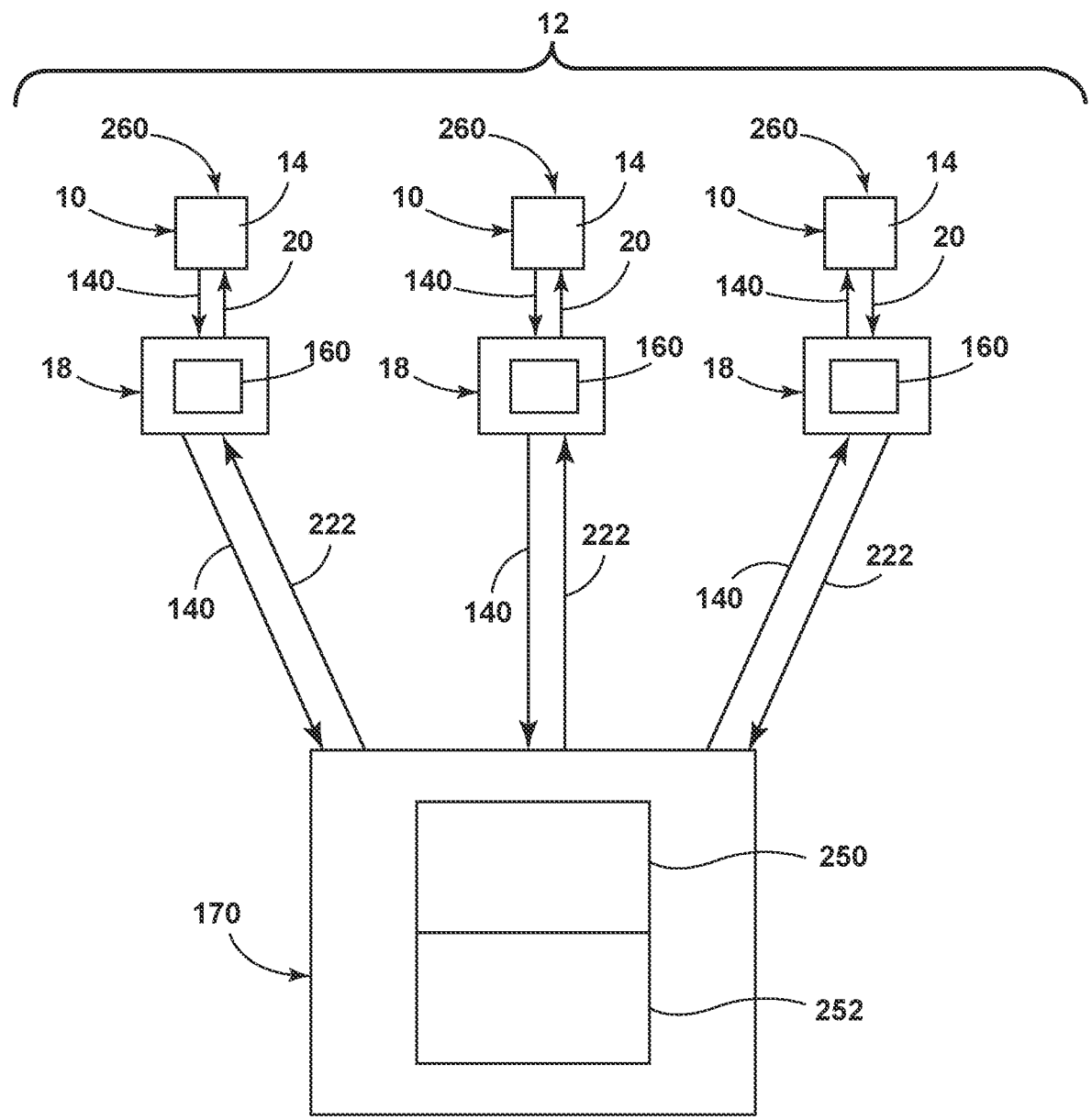
FIG. 12 is a schematic diagram of an aspect of the central controller for managing operations of multiple loading dock assemblies.

According to various aspects of the device, as exemplified in FIGS. 1-5 and 9-12, the user interface 160 for the loading dock assembly 10 is typically the primary interface between personnel within the facility 12 and the dock components 14 of the loading dock assembly 10. The user interface 160 can include a plurality of configurations that may be utilized for accomplishing different functions related to the loading dock assembly 10 and the dock components 14 thereof. Referring to FIG. 9, the user interface 160 can include an operator interface 210 that is utilized for initiating the operating sequence 20 and the various steps of the operating sequence 20. The operator interface 210 will typically serve as a default configuration of the user interface 160. As discussed herein, when the various dock components 14 are installed within the loading dock assembly 10, the control panel 18 utilizes the respective identification modules 60 of the dock components 14 for formulating the operating sequence 20 for the loading dock assembly 10.

The operator interface 210 of the user interface 160 allows personnel of the facility 12 to activate the various steps of the operating sequence 20. The personnel engaging the operator interface 210 can receive various prompts 212 and verifications regarding the status of the loading dock assembly 10. These verifications are intended to be confirmed before proceeding to the next step of the operating sequence 20. Once the previous step is completed and the protocols embedded in the control panel 18 are complied with, the operator interface 210 will allow the personnel to activate the next step in the operating sequence 20. Accordingly, while the control panel 18 formulates the operating sequence 20, personnel within the facility 12 engage the operator interface 210 for proceeding through the various steps of the operating sequence 20. This configuration helps to ensure various safety routines and protocols are incorporated within the operating sequence 20. These protocols typically include the protocols that are embedded in the control panel 18 and may also include certain protocols that the personnel may be trained to adhere to. This is particularly true where certain line-of-sight verifications may need to be made, or certain verifications need to be made where various personnel may not be able to see each other. Utilizing the dock components 14 of the loading dock assembly 10 and the user interface 160, personnel can verify that the previous step in the operating sequence 20 is complete and conditions around the loading dock assembly 10 are appropriate for continuing with activating the next step in the operating sequence 20.

Within the operator interface 210 of the user interface 160, the operator interface 210 communicates various information to the personnel within the facility 12. This information can include, but may not be limited to, the list of steps for the operating sequence 20, fault alerts, service alerts, software alerts, combinations thereof and other information. As the operating sequence 20 for the loading dock assembly 10 is performed, certain icons 282 or other indicia relating to the steps of the operating sequence 20 may be highlighted, such that they can be engaged at the appropriate time. Other steps of the operating sequence 20 that are not able to be performed can be hidden, unhighlighted, or otherwise rendered inoperable at that particular time. As the steps of the operating sequence 20 are completed, subsequent indicia within the operator interface 210 becomes accessible. This process continues and the operator interface 210 moves through the progression of steps of the operating sequence 20 by highlighting each step at the appropriate time. It should be understood that other graphic systems and indicia for prompting personnel of the facility 12 when to activate or initiate certain steps of the operating sequence 20 may be utilized.

According to various aspects of the device, the operator interface 210 may include bypass icons that may be used to stop the operating sequence 20, restart the operating sequence 20, or otherwise provide for some authorization or command prompt 212 that can be used to interrupt the operating sequence 20. Typically, activating a bypass icon will trigger an alarm that is recorded and provided to a central controller 170 for further analysis.

Referring now to FIGS. 1-5 and 9-12, the user interface 160 can also include an installer interface 220 that can be used during installation of added components 110 for the loading dock assembly 10. When the user interface 160 is configured to display the installer interface 220, various prompts 212 can be included for going through various steps and protocols for installing the added component 110 and configuring the redefined operating sequence 112 and the redefined sequential pattern 116. Using the new identification module 114 of the added component 110, the installer interface 220 can be used for updating the operating sequence 20 to generate the redefined operating sequence 112. Additionally, the installer interface 220 can be utilized for providing software installations 222, such as software updates, software upgrades, and other similar information technology functions.

It is contemplated that use of the installer interface 220 for installing an added component 110 of the loading dock assembly 10 will be conducted locally at the control panel 18 for the loading dock assembly 10. It is further contemplated that the software installations 222 and related IT functions can be conducted from a central location, such as the central controller 170, sometimes referred to as a gateway controller, for the facility 12. These software installations 222 and information technology related functions, or software-related functions, such as upgrades and updates can be conducted simultaneously among the various loading dock assemblies 10 within the facility 12. These software installations 222, as discussed above, can be conducted remotely or locally.

Referring again to FIGS. 1-5 and 9-12, the user interface 160 can also be configured to include a maintenance interface 230 that can be used during service of the loading dock assembly 10 and the dock components 14 thereof. This maintenance interface 230 can be used to activate a wireless data connection 232 with a portable computing device 234 of a service technician. Through this wireless data connection 232, various steps, checklists, procedures, and other maintenance-related steps can be communicated between the user interface 160 and the service technician that is maintaining the dock components 14. The use of the wireless data connection 232 allows the service technician to work on one of the dock components 14 without obtaining instructions directly from the user interface 160. The instructions can be wirelessly delivered to the service technician from the control panel 18, the central controller 170, or some other location. The information displayed and relayed by the maintenance interface 230 corresponds to the configuration of the respective loading dock assembly 10 and the specific dock components 14 that are incorporated therein. The installation of an added component 110 can also include an update of the maintenance interface 230 and the instructions and maintenance procedure that may be delivered for maintaining the added component 110.

According to the various aspects of the device, the operator interface 210 is typically the default configuration of the user interface 160. The operator interface 210 can include specific icons 282 or indicia for activating the installer interface 220 or the maintenance interface 230, as needed. It is also contemplated that the user interface 160 can provide informational prompts 212 to personnel of the facility 12 for activating the installer interface 220 and/or the maintenance interface 230 when desired or needed. These communicative prompts 212 for the user interface 160 can include fault messages relating to the various dock components 14 of the loading dock assembly 10. Where a fault is detected, the user interface 160 can indicate that the maintenance interface 230 should be activated and a service technician called for conducting maintenance and service to the various dock components 14 of the loading dock assembly 10. These service calls can also be scheduled at predetermined times such that the user interface 160, typically via the operator interface 210, can indicate that the timeframe for conducting service is approaching and a technician should be called for conducting service of the loading dock assembly 10. The communicative prompts 212 can also provide information related to the installer interface 220 and software installations 222 that will be initiated. The user interface 160 can be used for activating the installer interface 220 and initiating a software installation 222 at a time when the loading dock assembly 10 is not in use.

Referring again to FIGS. 2-5 and 12, according to various aspects of the device, the control panel 18 and the identification system 16 can cooperate to produce an activations log 140 that corresponds to the plurality of loading dock components 14. This activations log 140 can include information gathered from a plurality of loading dock stations 142 that are within the facility 12. Each loading dock station 142 of the plurality of loading dock stations 142 can include a respective plurality of loading dock components 14. During use of the facility 12, information regarding each of the respective loading dock assemblies 10 is recorded to generate an activations log 140. This information is maintained as a record and provides metrics and use information related to the number of cycles operated for each loading dock assembly 10, dates of activations, and other sets of information that can be used for monitoring the use of each of the loading dock assemblies 10 for the facility 12. As will be described more fully below, this information can be utilized for providing operators of the facility 12 with information related to maintenance, repair, replacement and other operations-related data.

Referring again to FIGS. 1-5, the loading dock assembly 10 includes a plurality of loading dock components 14. A plurality of identification modules 60 are attached to each installed component 24 of the plurality of loading dock components 14, respectively. A control panel 18 is placed in signal communication with the plurality of loading dock components 14 via the plurality of identification modules 60. The plurality of identification modules 60 automatically cooperates with the control panel 18 to generate an operating sequence 20 of the plurality of loading dock components 14. A power module 22 is in signal communication with the control panel 18 and the various installed components 24 of the plurality of loading dock components 14. The control panel 18 delivers, deploys or otherwise provides instructions to the power module 22 according to the operating sequence 20. The power module 22 delivers a predetermined electrical current 26 to the installed components 24 of the plurality of loading dock components 14 in a sequential pattern 28 that is defined as part of the operating sequence 20. The control panel 18 can include a master sequence 130 that includes a potential set 132 of loading dock components 14. The operating sequence 20 is generated by comparing the plurality of installed components 24 with the potential set 132 of loading dock components 14. The master sequence 130 is modified to include activations that correspond to the installed components 24 of the plurality of loading dock components 14. This modification of the master sequence 130 results in the generation of the operating sequence 20.

Referring now to FIGS. 1-6, having described various aspects of the loading dock assembly 10, a method 400 is disclosed for activating the loading dock station 142 for a facility 12. The method 400 includes installing a plurality of loading dock components 14 for a loading dock (step 402). The plurality of loading dock components 14 are then attached to a control panel 18 (step 404). As discussed above, attaching the plurality of loading dock components 14 to the control panel 18 is typically a plug-type connection that is made through the various module connections 72 of the control panel 18. According to the method 400, step 406 includes validating the identity of the plurality of loading dock components 14 using dedicated identification modules 60 of each dock component 14 to define validated components 150. The identification modules 60 deliver corresponding validating signals to the control panel 18. The control panel 18 uses the validation signals to confirm the dock components 14 as validated components 150. These validated components 150 are then operated as installed components 24 of the loading dock assembly 10.

According to the method 400, an operating sequence 20 is produced, wherein the control panel 18 automatically generates the operating sequence 20 based upon the validated components 150 (step 408). The control panel 18 is then attached to the power module 22 (step 410). The power module 22 is also attached to the plurality of loading dock components 14 (step 412). According to the method 400, the plurality of loading dock components 14 is activated and operated according to the operating sequence 20 (step 414). The control panel 18 directs the power module 22 to deliver the predetermined sequential pattern 28 of electrical current 26 to the plurality of loading dock components 14 according to the various protocols and the operating sequence 20 of the particular loading dock assembly 10.

The use of the identification module 60 to ascertain validated components 150 can be used to separate out or prevent installation of non-conforming components that may not work effectively with the installed components 24 of the loading dock assembly 10. This can also be used as a verification step to ensure that the dock component 14 is in working order. This validation step also sets up a communications protocol between the control panel 18 and the power module 22 and between the power module 22 and each installed component 24 of the loading dock assembly 10.

Referring now to FIGS. 1-5 and 7, according to various aspects of the device, a method 500 is disclosed for operating a loading dock assembly 10. According to the method 500, step 502 includes initiating the operating sequence 20. Once initiated, the control panel 18 communicates to the power module 22 via a low voltage data connection 80 and deploys or delivers specific instructions related to the operating sequence 20 (step 504). The power module 22 receives these instructions from the control panel 18 and delivers the predetermined sequence of electrical current 26 to the plurality of loading dock components 14 (step 506). As discussed above, the operating sequence 20 is dependent upon those installed components 24 that are installed as part of the loading dock assembly 10 and validated by the communication between the identification modules 60 and the control panel 18.

As exemplified in FIGS. 1-5 and 8, according to the various aspects of the device, a method 600 is disclosed for installing a component within a loading dock assembly 10. According to the method 600, an added component 110 is incorporated within the loading dock assembly 10 (step 602). A new identification module 114 of the added component 110 automatically communicates with the control panel 18 to validate the added component 110 (step 604). As discussed above, the new identification module 114 provides a validation signal to the control panel 18. The control panel 18 then verifies that the validation signal is from a conforming dock component 14. Once verified, the control panel 18 adds the dock component 14 as a validated component 150. According to the method 600, the control panel 18 redefines the operating sequence 20 to incorporate the validated component 150 to produce a redefined operating sequence 112 (step 606).

As discussed above, the various components that are installed within the loading dock assembly 10 are plugged into the control panel 18 to produce a validation of each installed component 24 that is part of the loading dock assembly 10. These validated components 150 are used to generate the operating sequence 20 for the loading dock assembly 10. This is done automatically as a communicating step between the various identification modules 60 and the control panel 18. The control panel 18, in certain aspects of the device, includes the master sequence 130 that is based upon a set of potential components that may be installed within a loading dock assembly 10. As discussed above, these potential sets 132 of components can be, as an example, all of the components that a particular manufacturer offers for installation as a loading dock assembly 10, or all possible features that can be installed as part of the loading dock assembly 10. Using these automatic communications to generate the operating sequence 20, various safety protocols are adhered to so that, regardless of those components that are installed within the loading dock assembly 10, the safety protocols are complied with through the operation of the loading dock assembly 10.

According to various aspects of the device, the control panel 18 can include the user interface 160 that provides various push-button or touch-screen activations for a user to initiate during an operating sequence 20 of the loading dock assembly 10. The communications between the identification modules 60 and the control panel 18 are automatic. The operating sequence 20 is typically, and at least partially, operated manually to ensure auditory and visual confirmation by facility personnel. This is to ensure that a particular step of the operating sequence 20 is complete and the subsequent step is safe to activate during an operating cycle for the loading dock assembly 10. The user interface 160 can be attached directly to the control panel 18, or can be a separate panel that is placed in communication with the control panel 18.

Referring again to FIGS. 1-5 and 12, according to various aspects of the device, the control panel 18 can be a central controller 170 that is in communication with multiple loading dock assemblies 10 within the facility 12. It is also contemplated that each loading dock assembly 10 can include its own control panel 18. In such an embodiment, the control panel 18 is typically connected with a master controller 170 that receives information from each of the control panels 18 and assists in generating the activations log 140 for the loading dock assemblies 10 for that facility 12.

Referring again to FIGS. 1-5 and 9-12, the central controller 170, which can be referred to as a gateway controller, is typically in communication with each control panel 18 for each loading dock assembly 10. Accordingly, information from the central controller 170 can be communicated to the individual loading dock assemblies 10 via the control panel 18 and the user interface 160 of each dedicated control panel 18. In addition, information, such as activation logs 140, can be transferred from the control panel 18 to the central controller 170 for accumulating various data within a data tank 250 of the central controller 170. The information collected at the central controller 170, as well as information collected within each dedicated control panel 18, can be used for formulating and operating a performance management system 252 that can include various metrics, service schedules, yard management schedules, and other information related to each individual loading dock assembly 10 as well as the collection of loading dock assemblies 10 for the facility 12.

In addition, the central controller 170 and the individual control panels 18 can operate the performance management system 252 for managing the efficiency of each loading dock assembly 10 as well as the facility 12 in general. The performance management system 252 can be a proactive system that is in communication with each of the various sensors 260 for the dock components 14. By way of example, and not limitation, where a trailer or vehicle 34 is parked at a particular loading dock assembly 10, sensors 260 within that loading dock assembly 10 can communicate to the control panel 18, as well as the central controller 170, that a vehicle 34 is present. The operator interface 210 of the user interface 160 can provide a prompt 212 to personnel of the facility 12 that the operating sequence 20 for that particular loading dock assembly 10 needs to be initiated and performed. The amount of time between the initial prompt 212 communicated through the user interface 160 and when the operating sequence 20 is initiated can be communicated to the data tank 250 and recorded and analyzed as part of the performance management system 252. The performance management system 252 can then evaluate and review the various processes included within the facility 12 and each loading dock assembly 10 for providing metrics and making recommendations for how to improve these procedures within the facility 12. In addition, time stamps can be applied to each activation within the loading dock assembly 10 to assess how quickly the loading dock assembly 10 is performing and how efficiently the personnel of the facility 12 are interacting with the control panel 18 and the user interface 160 for the loading dock assembly 10.

According to various aspects of the device, the central controller 170 and the control panel 18 cooperate with personnel of the facility 12 for formulating and initiating the operating sequence 20 of the loading dock assembly 10. As discussed herein, the control panel 18 cooperates with the identification modules 60 of the individual dock components 14 to formulate the operating sequence 20. The user interface 160, the control panel 18 and the central controller 170 cooperate to prompt the personnel of the facility 12 that the operating sequence 20 needs to be initiated due to the presence of a vehicle 34 at the loading dock assembly 10. The personnel of the facility 12 are then required to initiate performance of the various steps of the operating sequence 20 using the operator interface 210. These systems are monitored and evaluated using the time stamped activations of the loading dock assembly 10 for evaluating the various processes within the loading dock assembly 10. Using this configuration, the control panel 18 and the central controller 170 can provide realtime factors and realtime information to the personnel using the user interface 160. This information can be used to make the current operation, as well as subsequent operations, of the loading dock assembly 10 more efficient. In addition, various metrics and data are recorded for evaluating and providing recommendations for how the facility 12 and the personnel of the facility 12 can be more efficient at operating the various loading dock assemblies 10.

According to various aspects of the device, the performance management system 252 can use the various activation logs 140 and data from sensors 260 of the loading dock components 14 for collecting, analyzing and evaluating information related to the various loading dock assemblies 10. In addition, information related to each of the dock components 14 can be collected by the central controller 170. Such information can include, but is not limited to, positioning of the various dock components 14, time between activations, time between cycles, down time between steps of the operating sequence 20, lack of activity of certain dock components 14, and other information. This information is gathered within the data tank 250 of the central controller 170. This information is then analyzed and evaluated for providing updates via software installations 222, making recommendations for installing added components 110 or for removing certain dock components 14 from the loading dock assemblies 10, as well as making recommendations for how the prompts 212 are communicated to the personnel of the facility 12.

According to various aspects of the device, the various sensors 260 that are used to gather data that is delivered to the data tank 250 of the central controller 170 can be attached to each dock component 14 of the loading dock assembly 10. In addition, certain dock components 14 can include multiple sensors 260 where the dock component 14 may be a more complex mechanism. By way of example, and not limitation, a dock leveler 40 having a dock lip 48 may include a plurality of sensors 260 for assessing rotational positions of the components, assessing how long the various components have been in a particular position, and other similar information. It is contemplated that this information is collected automatically over the course of cycles of operation for each loading dock assembly 10. Additionally, the central controller 170 can extract this information from the sensors 260 and from the control panel 18 in realtime so that the performance management system 252 can continually update the various metrics and information parameters for the facility 12.

According to various aspects of the device, the performance management system 252 can be categorized based upon configurations of the various loading dock assemblies 10. The loading dock assemblies 10 at the facility 12 may include varying dock components 14 that may vary throughout the facility 12. The various metrics generated by the performance management system 252 and the central controller 170 can relate to these particular configurations of loading dock assemblies 10, as well as locations of loading dock assemblies 10 within the facility 12. Using this information, the performance management system 252 can assess whether modifications should be made to certain loading dock assemblies 10 within the facility 12 or whether certain loading dock assemblies 10 should be relocated to other portions of the facility 12. Other considerations can be evaluated and analyzed by the central controller 170 and the various control panels 18 for the facility 12.

As described herein, the control panels 18 can include a master sequence 130. This master sequence 130 can be a universal sequence that is used by all control panels 18 of a certain manufacturer. It is also contemplated that control panels 18 can be fitted with any one of various master sequences 130 that correspond to a particular type of loading dock assembly 10. Such loading dock assemblies 10 may include, but are not limited to, rotating dock levelers, elevating dock levelers, lip plates, edge-of-dock levelers, combinations thereof and other similar dock leveling mechanisms.

Referring now to FIGS. 2-4 and 13-16, the control panel 18 includes a user interface 160 that is used by various personnel during installation of loading dock components 14, performance of the operating sequence 20 of the loading dock assembly 10 and during service or troubleshooting of the loading dock assembly 10, including the control panel 18 and the power module 22. During operation of the control panel 18, the user interface 160 includes dedicated icons 282 for each context-specific function (CSF) 280 that can be activated and deactivated depending upon the conditions within and around the loading dock assembly 10. In this manner, the user interface 160 for the control panel 18 can include various buttons, touch screens, switches, and other interface mechanisms that the users of the loading dock assembly 10 can utilize for accomplishing certain functions related to the loading dock assembly 10. Accordingly, the user interface 160 can reconfigure the available icons 282 depending on whether the user interface 160 is presenting the operator interface 210, the installer interface 220, the maintenance interface 230 or other interface function of the control panel 18.

Figure 13:
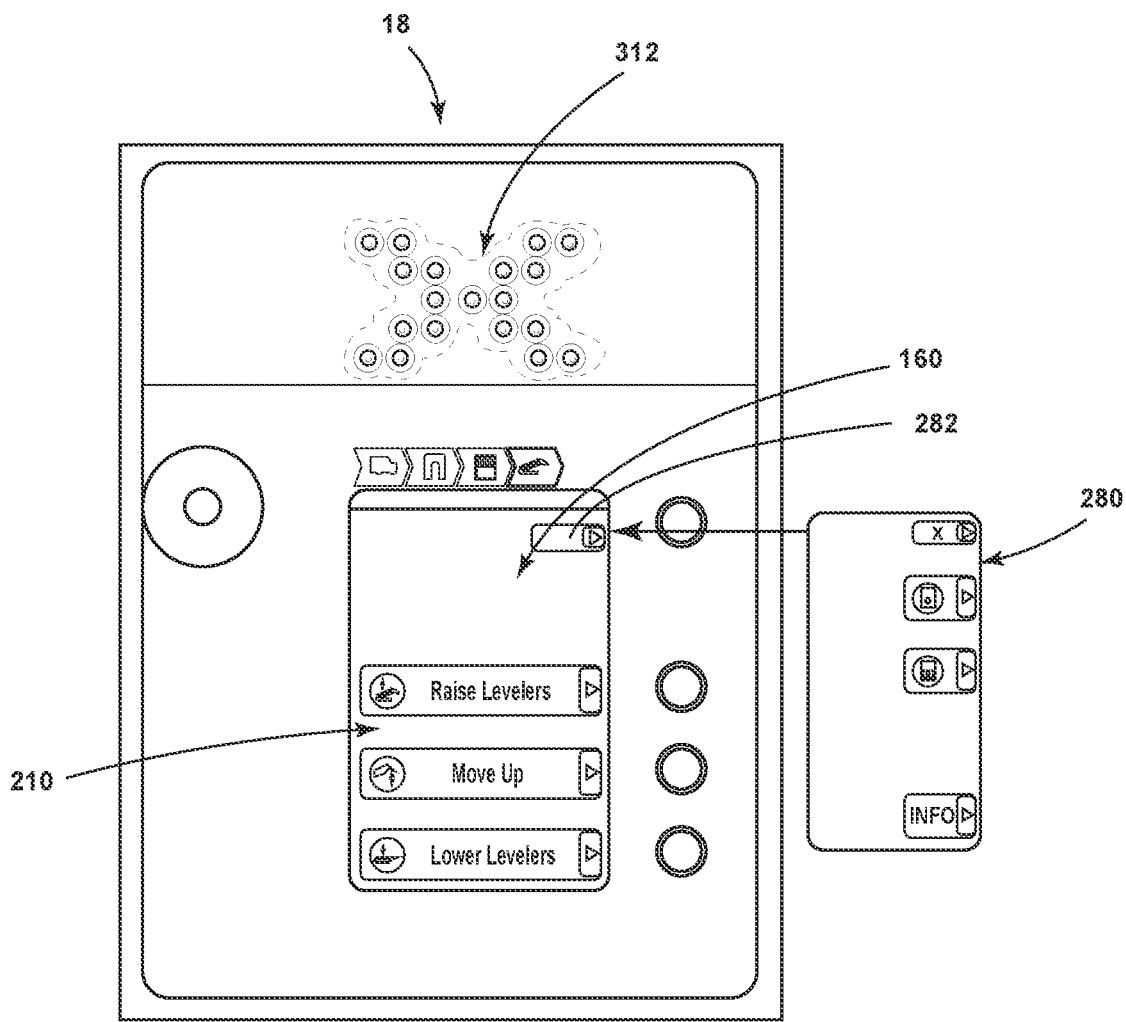
FIG. 13 is an exemplary design for a user interface disposed within the control panel for operating a loading dock assembly.

As exemplified in FIG. 13, the user interface 160 can be in the form of a touchscreen, having various icons 282 that can be selected. As described herein, these icons 282 can be utilized for activating certain functions of the control panel 18. These functions can include, but are not limited to, installation or removal of dock components 14, operation of the operating sequence 20 of the loading dock assembly 10 and troubleshooting or servicing of the loading dock assembly 10. Selection of a particular icon 282 can reconfigure the user interface 160 to present certain CSF icons 282 that relate only to that selected function that is currently being utilized.

In use, where a user is operating the loading dock assembly 10 according to the operating sequence 20, only those CSF icons 282 that relate to the presently occurring step or function of the operator interface 210 are available for interaction by a user. In this manner, during each step of the operating sequence 20 and under each function of the control panel 18, the user interface 160 reconfigures to present only those icons 282 of the CSF 280 that relate to the current step or function. Using this configuration of the user interface 160, inadvertent or accidental engagement of unrelated functions can be mitigated or eliminated. As a non-limiting example, where a user desires to install an added component 110 for the loading dock assembly 10, an installation menu of the user interface 160 can be activated to present only those icons 282 related to the installer interface 220. Within icons 282 of the installer interface 220, only those icons 282 related to current steps of the installation of a particular loading dock component 14 are able to be selected. All other selections are either temporarily removed from the user interface 160 or are visually muted and rendered unselectable. As the user moves through the process of installing the new loading dock component 14, each step in the process may result in the modification of the installer interface 220 to provide those icons 282 of the CSF 280 that are available during that particular phase of the operation. Once the installer interface 220 has completed its operation, the user interface 160 for the control panel 18 returns to a main menu to provide for multiple selections by a user.

Within the user interface 160 of the control panel 18, a progressive indicator is included to guide a user through the various steps of the operating sequence 20. As exemplified in FIGS. 13-16, the progressive indicator can be in the form of a progress bar 290 that provides the steps of the sequence, the current step, the steps that have been completed and the steps that are yet to be completed. Each step corresponds to dedicated icons 282 that relate to the current step of the operating sequence 20 for the operator interface 210, the installer interface 220, the maintenance interface 230 or other interface function of the control panel 18.

In the case of an operating sequence 20 of the operator interface 210, the progress bar 290 provides icons 282 related to each step of the operating sequence 20. As the operating sequence 20 is performed, the progress bar 290 and the icons 282 change to match the current step. As discussed herein, the icons 282 of the CSF 280 are presented within the user interface 160 that relate only to that portion of the progress bar 290 that is illuminated. As each step in the operating sequence 20 is completed, the subsequent section within the progress bar 290 is activated and the user interface 160 changes to provide only those icons 282 of the current CSF 280 that are available during that step.

Use of the icons 282 of the CSF 280 provide a user interface 160 that can be utilized without inadvertently pressing an improper icon 282, as irrelevant indicators are not available for selection. Additionally, during operation of the loading dock assembly 10, shift changes and personnel changes may occur. By having a consistent progress bar 290 with only those icons 282 of the CSF 280 related to the current step available, a new operator can quickly ascertain what step in the process of the operating sequence 20 for the loading dock assembly 10 is being performed.

Figure 14:
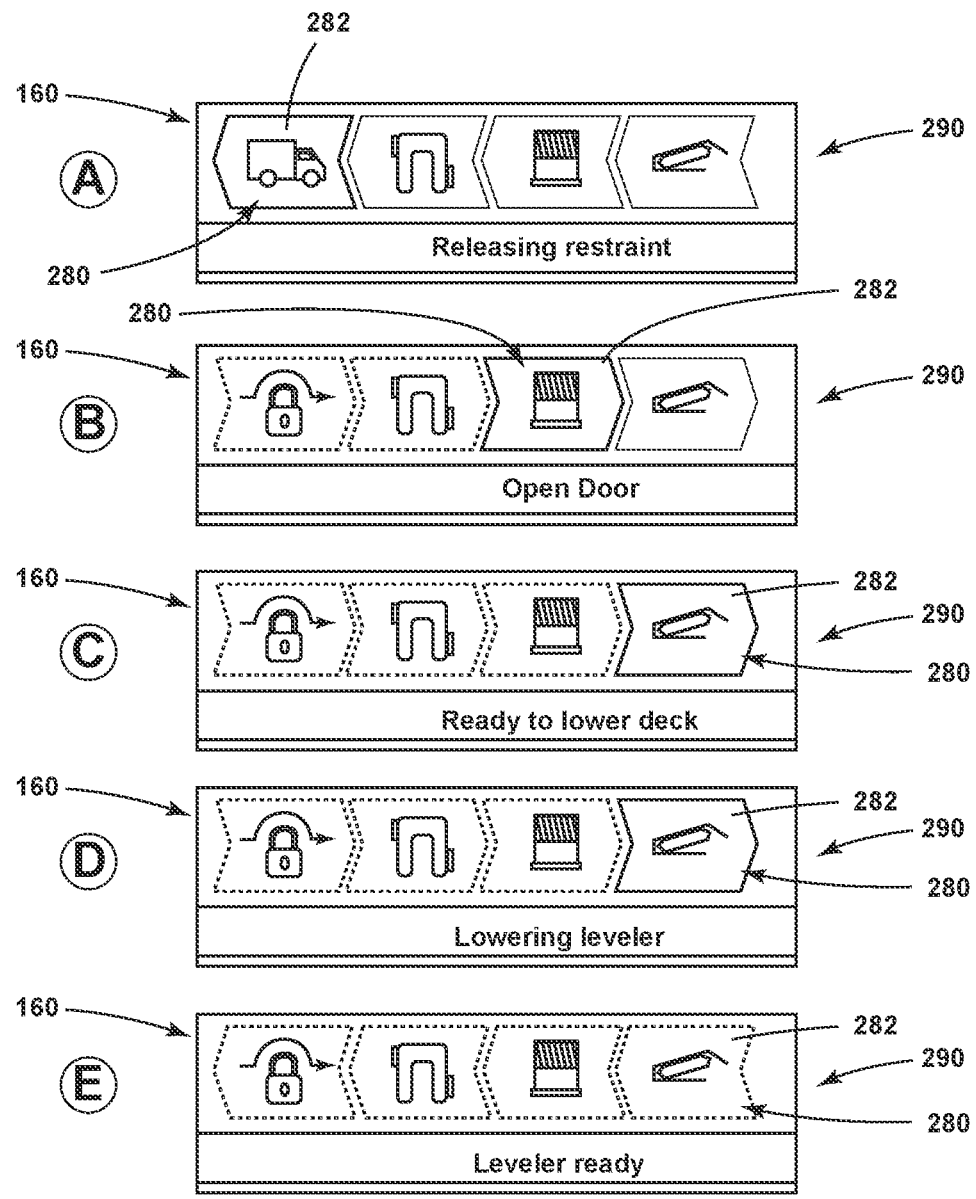
FIG. 14 is a schematic diagram illustrating a progression of progress icons showing the status of the loading dock assembly during performance of the operating sequence.
Figure 15:
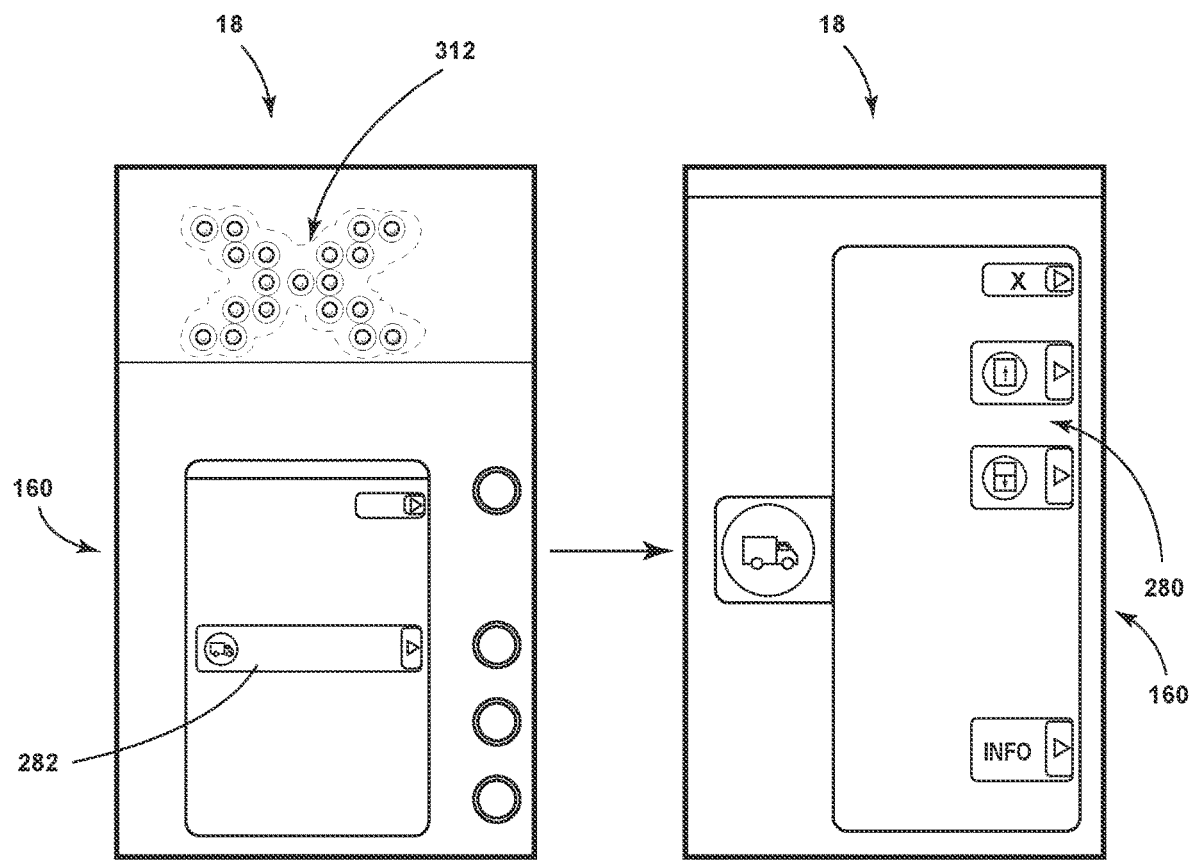
FIG. 15 is a schematic diagram illustrating an aspect of the user interface for a control panel that utilizes context-specific functions.

As exemplified in FIG. 14, images A-E represent sequences of the progress bar 290 that show which step is being operated at any particular time. Icons 282 illuminated in a particular color may show the current step of the operating sequence 20. Icons 282 of different colors may show those steps that have been completed and those that are yet to be completed.

While the term "progress bar" is described herein, it is contemplated that the user interface 160 can include any one of various sequential-type interfaces that show the steps and progress of a particular sequence of events that are used to accomplish a certain function with respect to the loading dock assembly 10. It should be understood that pie charts, linear indicia, and other progressive infographics can be used as well.

As described herein, when certain components are installed or removed from the loading dock assembly 10, the control panel 18 automatically updates the operating sequence 20 to account for a change in the dock components 14 installed within the loading dock assembly 10. In addition, the user interface 160, including the progress bar 290 and the individual icons 282 for each step represented by the various CSF 282, are also reconfigured to accommodate changes in the dock components 14 of the loading dock assembly 10. These changes can occur during the installation process using the installer interface 220 of the control panel 18. As further described herein, modification of the user interface 160 when installing an added component 110 is accomplished automatically during operation of the installer interface 220. The various instructions and commands for modifying the user interface 160 can be contained within the control panel 18, within the added component 110 being connected with the loading dock assembly 10, or a combination of each.

Referring again to FIGS. 13-15, during operation of a particular sequence, such as the operating sequence 20 of the loading dock assembly 10, the progress bar 290 is illuminated and visible at all times. It is typical that the performance of the various operating sequences 20 that occur during the time that a vehicle 34 is parked at a loading dock assembly 10 of the facility 12 may take several hours. As discussed herein, shift changes within the facility 12 and changes in personnel for breaks may require different individuals to manage a particular operating sequence 20 of the loading dock assembly 10. Because the progress bar 290 is continuously illuminated and visible, any number of people can take over supervision of a particular operating sequence 20 of the loading dock assembly 10. This configuration of the control panel 18 and the user interface 160 assists in the seamless operation of the facility 12 throughout the course of a day and through personnel changes.

Figure 16:
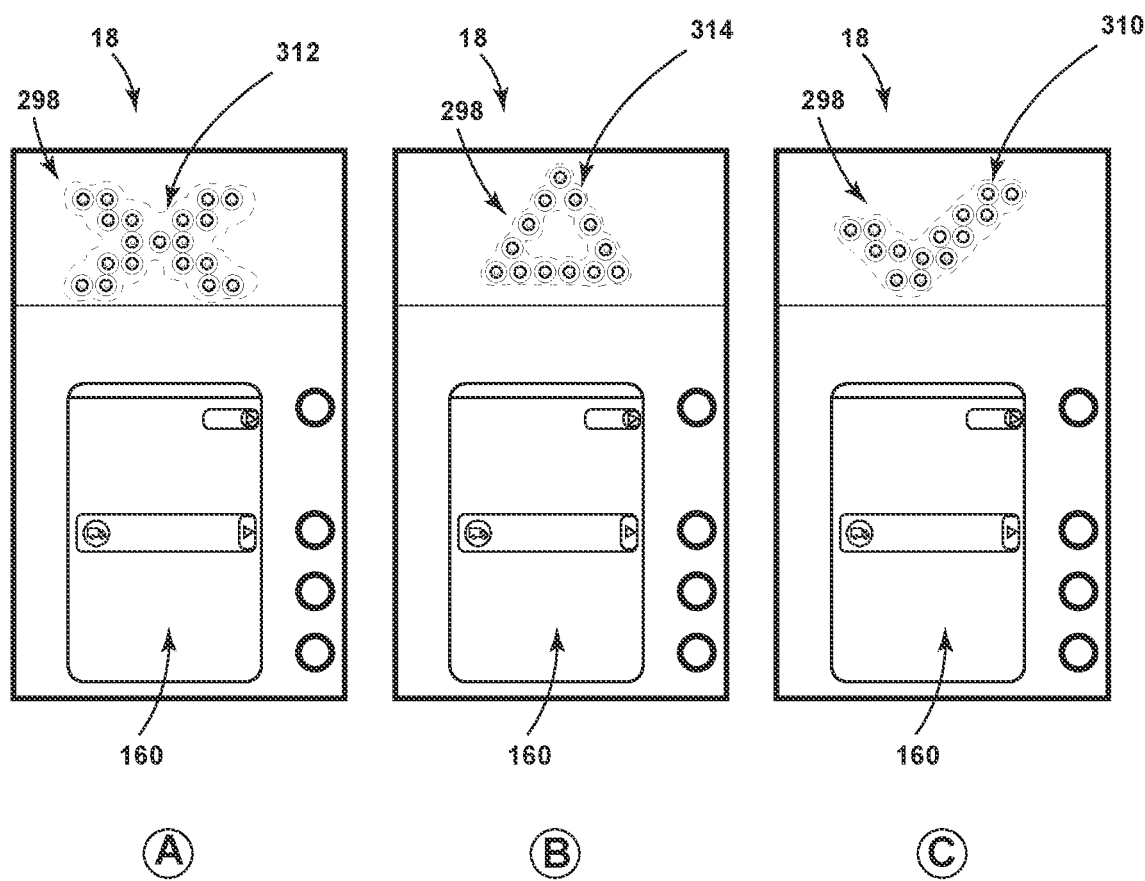
FIG. 16 is a schematic diagram of the user interface for the control panel incorporating an aspect of a transfer proceed indicator.

Referring now to FIG. 16, the user interface 160 can include a transfer proceed indicator 298 within the control panel 18. Typically, the transfer proceed indicator 298 is an illuminated indicia that instructs a forklift operator whether it is safe to proceed over the dock leveler 40 and into a vehicle 34 or whether it is unsafe to do so. As exemplified in parts A-C of FIG. 16, these illuminations of the transfer proceed indicator 298 can be color-coded and also present different shapes to indicate a safe condition 310 or unsafe condition 312. The transfer proceed indicator 298 is designed to be seen from various locations and perspectives around the loading dock assembly 10. As discussed herein, changes in the dock components 14 within the loading dock assembly 10 typically results in some modification of the user interface 160 and the various icons 282 of one or more CSF 280. These changes can also affect when during the course of the operating sequence 20 the transfer proceed indicator 298 indicates the safe condition 310 and the unsafe condition 312.

It is also contemplated that the transfer proceed indicator 298 can include a bypass indicator 314. This bypass indicator 314 can illuminate when some feature of the vehicle 34 parked at the loading dock assembly 10 includes a non-conforming aspect. By way of example, and not limitation, where an ICC bar of the trailer or other vehicle 34 is bent or absent, certain vehicle restraints 44 may be rendered inoperative at holding the vehicle 34 in place with respect to the loading dock assembly 10. Using the bypass indicator 314, a supervisor can enter a particular code, command, or other override. Using a bypass sequence, the supervisor can visually inspect whether certain secondary processes are put in place for achieving the desired result. In the case of a damaged or absent ICC bar, the supervisor can utilize the bypass sequence to ensure that wheel chocks, or other barricade restraints are positioned around the vehicle 34 to prevent the vehicle 34 from moving with respect to the loading dock assembly 10. In each step of these bypass sequences that involves the non-conforming aspect, the supervisor must verify using the bypass code or override that these secondary measures have, in fact, been put in place.

As exemplified in FIG. 16, the indicator for the safe condition 310 is a green check mark and the indicator for the unsafe condition 312 is a red "X." The bypass indicator 314 can be in the form of a yellow triangle. Other colors, shapes and configurations of these indicators of the transfer proceed indicator 298 are also contemplated. Again, the transfer proceed indicator 298 is used for communicating the status of the dock leveler 40 and the remainder of the loading dock assembly 10 to those seeking to enter the vehicle 34 from within the facility 12.

It is contemplated that the various surfaces of the control panel 18 can include a background area that can change color depending on the appearance of the user interface. By way of example and not limitation, the background area surrounding the transfer proceed indicator 298 can be black in color so that the color and shape of the transfer proceed indicator 298 is readily distinguishable. It is also contemplated that the background areas of the control panel 18 that are within and around the user interface 160 can change color depending on the appearance of the user interface 160 and changes in the look of the user interface 160.

According to the various aspects of the device, attachment of an added component 110 to the loading dock assembly 10 can include attaching various components to the control panel 18. As described herein, the interaction between the added component 110 and the control panel 18 provides for an update in the operating sequence 20 and each CSF 280 of the user interface 160 for operating the loading dock assembly 10. When connecting an added component 110 to the control panel 18, it is contemplated that the identification module 60 of an added component 110 can be attached directly to the plug interface 70 of the control panel 18. It is also contemplated that the identification module 60 of an added component 110 can be attached to the control panel 18 via a separate dock component 14 of the loading dock assembly 10. This type of connection between the dock components 14, then to the plug interface 70 of the control panel 18 can be through the various identification modules 60 of the dock components 14. By way of example, and not limitation, a lighting system 46 for the loading dock assembly 10 can be attached to a loading dock door 42, which is then attached to the plug interface 70 of the control panel 18. Accordingly, communications between an added component 110 can occur through other dock components 14 within the loading dock assembly 10. This configuration can be used to minimize the number of wires that are provided from the loading dock assembly 10 and to the control panel 18. This configuration also efficiently uses the plug interface 70 of the control panel 18.

Where multiple dock components 14 are connected together using the identification modules 60, a single module connection 72 can extend from one of the identification modules 60 and to the plug interface 70 of the control panel 18. The control panel 18 is configured to receive the signals from the plurality of identification modules 60 through a single module connection 72. Because each identification module 60 has a unique data signature, the control panel 18 is able to discern and organize these signals to provide a series of dedicated data connections 80 between the control panel 18 and one or more identification modules 60 of respective dock components 14. Again, these discrete data connections 80 are able to be provided using a single plug interface 70 of the control panel 18.

Referring again to FIGS. 2-4 and 13, attachment of the various dock components 14 of the loading dock assembly 10 to the control panel 18 can occur through any one of various connection types. Various generic connectors can be utilized for attaching the loading dock components 14 to the loading dock assembly 10. It is also contemplated that a wireless connection can be utilized for installing and removing the various loading dock components 14 from the loading dock assembly 10. Typically, a wired connection will be utilized between the various dock components 14 of the loading dock assembly 10 and the control panel 18 to act as a backup where a wireless system may intermittently fail or lose signal.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A dock apparatus comprising:
    a plurality of loading dock components;
    an identification system having a plurality of identification modules that are respectively coupled with the plurality of loading dock components;
    a control panel in signal communication with the plurality of loading dock components via the plurality of identification modules, wherein the identification system automatically cooperates with the control panel to define an operating sequence of the plurality of loading dock components; and
    a power module in signal communication with the control panel, and an installed component of the plurality of loading dock components, wherein the control panel provides instructions to the power module according to the operating sequence and the power module delivers a predetermined electrical current to the installed components of the plurality of loading dock components in a sequential pattern defined by the operating sequence, wherein the signal communication between the control panel and the plurality of loading dock components and between the control panel and the power module is delivered over respective low-voltage data connections, and wherein the predetermined electrical current is delivered to the installed components over a high-voltage connection using a respective power delivery switch of a plurality of power delivery switches.

2. The dock apparatus of claim 1, wherein the control panel includes a user interface that is configured to initiate the operating sequence, and wherein the user interface includes an operating interface that is manually engaged to activate at least a portion of the operating sequence.

3. The dock apparatus of claim 1, wherein the plurality of loading dock components includes at least a dock leveler, a dock door, a vehicle restraint and a lighting system.

4. The dock apparatus of claim 1, wherein addition of an added component to the plurality of loading dock components defines a redefined operating sequence, wherein the added component includes a new identification module of the identification system, and wherein the identification system having the new identification module automatically communicates with the control panel to produce the redefined operating sequence that corresponds to a redefined sequential pattern of electrical current delivered by the power module to the plurality of loading dock components, and wherein the added component includes a dedicated electrical connection to a dedicated power delivery switch of the plurality of power delivery switches.

5. The dock apparatus of claim 1, wherein the power module includes at least one electrical transformer for providing at least two distinct electrical currents to the plurality of loading dock components via the plurality of power delivery switches.

6. The dock apparatus of claim 1, wherein the control panel and the identification system cooperate to produce an activations log that corresponds to the plurality of loading dock components.

7. The dock apparatus of claim 6, wherein the activations log includes information gathered from a plurality of loading dock stations, each loading dock station of the plurality of loading dock stations having a respective plurality of loading dock components.

8. The dock apparatus of claim 1, wherein the plurality of identification modules communicate with the control panel to automatically generate the operating sequence, and wherein each component of the plurality of loading dock components includes a separate connection with the plurality of power delivery switches, respectively.

9. The dock apparatus of claim 1, wherein the control panel includes a master sequence that includes a potential set of loading dock components, and wherein the operating sequence is generated by comparing the plurality of loading dock components with the potential set of loading dock components and modifying the master sequence to include activations of the plurality of power delivery switches that correspond to the installed components of the plurality of loading dock components.

10. The dock apparatus of claim 1, wherein the control panel includes a master sequence that includes a potential set of loading dock components, and wherein the operating sequence is generated by comparing the plurality of loading dock components with the potential set of loading dock components and modifying the master sequence to exclude activations of the plurality of power delivery switches that do not correspond to the installed components of the plurality of loading dock components.

11. A method for activating a loading dock station, the method comprising steps of:
    installing a plurality of loading dock components on a loading dock;
    attaching the plurality of loading dock components to a control panel via a low-voltage connection;
    validating an identity of the plurality of loading dock components using dedicated identification modules of each installed component of the plurality of loading dock components to define validated components;
    producing an operating sequence, wherein the control panel automatically generates the operating sequence based upon the validated components;
    attaching the control panel to a power module via a low-voltage data connection;
    attaching the power module to the plurality of loading dock components using a high-voltage connection; and
    activating the plurality of loading dock components according to the operating sequence, wherein the control panel directs the power module to deliver a predetermined sequence of electrical current to the plurality of loading dock components, and wherein the high-voltage connection is separate from the low-voltage connection and the low-voltage data connection.

12. The method of claim 11, wherein the step of activating the plurality of loading dock components according to the operating sequence includes manually deploying at least a portion of the operating sequence via a user interface of the control panel.

13. The method of claim 11, wherein the step of producing the operating sequence includes:
    comparing the plurality of loading dock components with a potential set of loading dock components of a master sequence; and
    modifying the master sequence to include activations that correspond to the installed components of the plurality of loading dock components.

14. The method of claim 11, wherein the step of producing the operating sequence includes:
- comparing the plurality of loading dock components with a potential set of loading dock components of a master sequence; and
- modifying the master sequence to exclude activations that do not correspond to the installed components of the plurality of loading dock components.

15. The method of claim 11, further comprising:
- installing an added component to the plurality of loading dock components, the added component having a new identification module;
- validating the identity of at least the added component using the new identification module;
- delivering a validation signal from at least the new identification module to the control panel; and
- producing a redefined operating sequence, wherein the control panel automatically generates the redefined operating sequence based upon the validation signals from the added component and the installed components.

16. The method of claim 11, wherein the step of validating the identity of the plurality of loading dock components includes:
- delivering a validation signal from each dedicated identification module of the installed components to the control panel.

17. A dock apparatus comprising:
- a plurality of loading dock components;
- a plurality of identification modules that are attached to each component of the plurality of loading dock components, respectively;
- a control panel in signal communication with the plurality of loading dock components via the plurality of identification modules, wherein the plurality of identification modules automatically cooperates with the control panel to generate an operating sequence of the plurality of loading dock components; and
- a power module in signal communication with the control panel, and an installed component of the plurality of loading dock components, wherein the control panel selectively provides instructions to the power module via a low-voltage data connection according to the operating sequence and the power module delivers a predetermined electrical current via a high-voltage connection to the installed components of the plurality of loading dock components in a sequential pattern defined by the operating sequence, wherein;
  - the low-voltage data connection is separate from the high-voltage connection;
  - the instructions are deployed to the power module using a user interface of the control panel;
  - the control panel includes a master sequence that includes a potential set of loading dock components;
  - the operating sequence is generated by comparing the plurality of loading dock components with the potential set of loading dock components; and
  - the master sequence is modified to include activations that correspond to the installed components of the plurality of loading dock components.

18. The dock apparatus of claim 17, wherein the plurality of loading dock components includes at least a dock leveler, a dock door, a vehicle restraint and a lighting system.

19. The dock apparatus of claim 17, wherein the control panel and the plurality of identification modules cooperate to produce an activations log that corresponds to the plurality of loading dock components, wherein the activations log includes information gathered from a plurality of loading dock stations, each loading dock station of the plurality of loading dock stations having a respective plurality of loading dock components.

20. The dock apparatus of claim 17, wherein the power module includes a plurality of power delivery switches that are connected to the plurality of loading dock components, respectively, wherein the control panel communicates the operating sequence and performs the sequential pattern at least by operating the plurality of power delivery switches.

* * * * *